United States Patent
Smith et al.

(10) Patent No.: US 8,839,892 B2
(45) Date of Patent: Sep. 23, 2014

(54) CENTERING DEVICE FOR LOAD TRANSPORTING APPARATUS

(71) Applicants: Shawn R. Smith, Hillsboro, OR (US); Harlan B. Smith, Hillsboro, OR (US)

(72) Inventors: Shawn R. Smith, Hillsboro, OR (US); Harlan B. Smith, Hillsboro, OR (US)

(73) Assignee: Entro Industries, Inc., Hillsboro, OR (US)

(*) Notice: Subject to any disclaimer, the term of this patent is extended or adjusted under 35 U.S.C. 154(b) by 0 days.

(21) Appl. No.: 13/917,531

(22) Filed: Jun. 13, 2013

(65) Prior Publication Data

US 2013/0277124 A1    Oct. 24, 2013

Related U.S. Application Data

(63) Continuation of application No. 13/711,315, filed on Dec. 11, 2012, now Pat. No. 8,490,724.

(60) Provisional application No. 61/576,657, filed on Dec. 16, 2011.

(51) Int. Cl.
    *B62D 57/032*    (2006.01)
    *B62D 57/02*     (2006.01)

(52) U.S. Cl.
    CPC .............. *B62D 57/032* (2013.01); *B62D 57/02* (2013.01)
    USPC ......................................................... 180/8.6

(58) Field of Classification Search
    USPC ........................................... 180/8.1, 8.5, 8.6
    See application file for complete search history.

(56) References Cited

U.S. PATENT DOCUMENTS

| | | |
|---|---|---|
| 2,259,200 A | 10/1941 | Cameron et al. |
| 2,290,118 A | 7/1942 | Page |
| 2,914,127 A | 8/1955 | Ricouard |
| 2,777,528 A | 1/1957 | Jourdain |
| 2,942,676 A | 12/1957 | Krau |
| 3,113,661 A | 12/1963 | Linke et al. |
| 3,135,345 A | 6/1964 | Scruggs |
| 3,249,168 A | 5/1966 | Klein |
| 3,255,836 A | 6/1966 | Hoppmann et al. |
| 3,446,301 A | 5/1969 | Thomas |
| 3,528,341 A | 9/1970 | Rieschel |
| 3,576,225 A | 4/1971 | Chambers |
| 3,921,739 A | 11/1975 | Rich et al. |
| 5,492,436 A | 2/1996 | Suksumake |
| 5,921,336 A | 7/1999 | Reed |

(Continued)

FOREIGN PATENT DOCUMENTS

| | | |
|---|---|---|
| CH | 359422 | 1/1962 |
| DE | 2418411 | 10/1975 |

(Continued)

OTHER PUBLICATIONS

Stolowitz Ford Cowger LLP, "Listing of Related Cases", May 28, 2013, 1 page.

*Primary Examiner* — Kevin Hurley
(74) *Attorney, Agent, or Firm* — Stolowitz Ford Cowger LLP

(57) ABSTRACT

Embodiments of the present invention are directed to a load transporting apparatus that automatically centers a support foot of the apparatus about a roller assembly during a recovery phase of an incremental walking movement. In particular, the load transporting apparatus includes guide devices positioned adjacent to a roller assembly that deflect a biasing device during non-linear load transporting movements, where the biasing device acts to automatically return the support foot to a centered position relative to the roller assembly after a non-linear movement has been completed and the support foot is raised above a ground surface.

20 Claims, 20 Drawing Sheets

(56) References Cited

U.S. PATENT DOCUMENTS

| | | |
|---|---|---|
| 6,581,525 B2 | 6/2003 | Smith |
| 6,612,781 B1 | 9/2003 | Jackson |
| 7,681,674 B1 | 3/2010 | Barnes et al. |
| 7,806,207 B1 | 10/2010 | Barnes et al. |
| 7,819,209 B1 | 10/2010 | Bezner |
| 8,051,930 B1 | 11/2011 | Barnes et al. |
| 2013/0153309 A1 | 6/2013 | Smith et al. |
| 2013/0156538 A1 | 6/2013 | Smith et al. |
| 2013/0156539 A1 | 6/2013 | Smith et al. |

FOREIGN PATENT DOCUMENTS

| | | |
|---|---|---|
| EP | 469182 | 10/1990 |
| GB | 2315464 | 2/1998 |
| WO | 2004103807 | 12/2004 |
| WO | 2010036713 | 12/2010 |

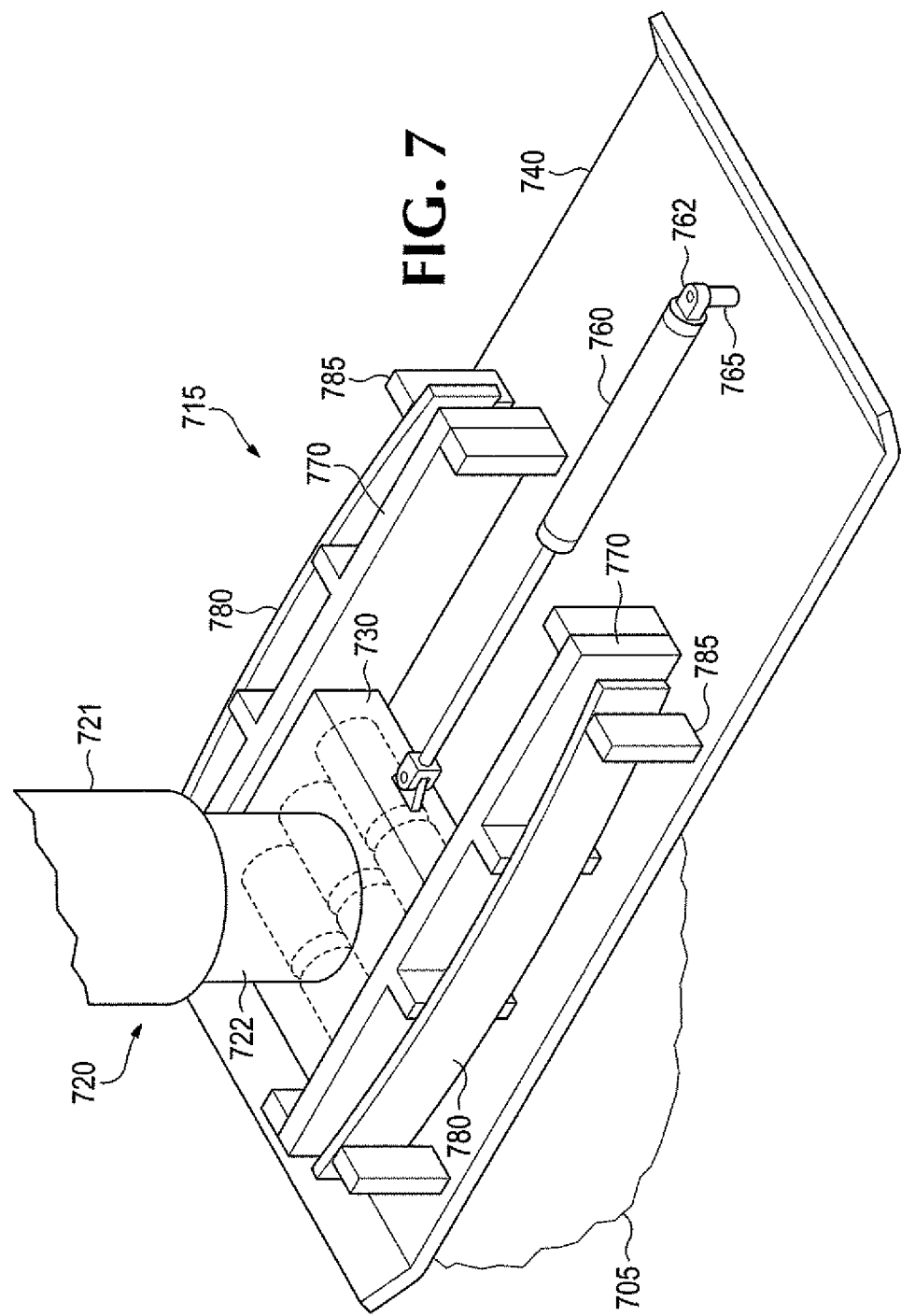

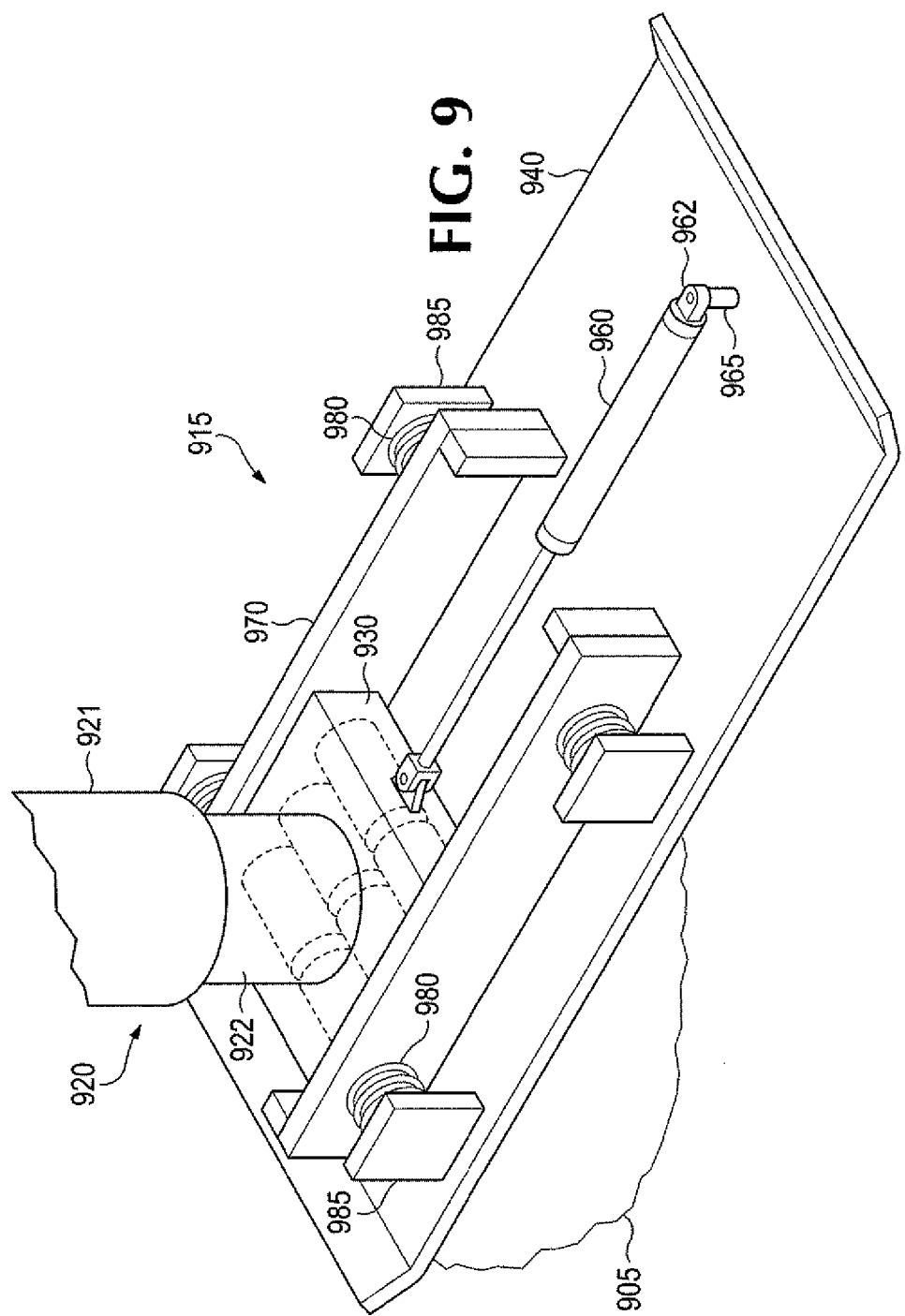

CENTERING DEVICE FOR LOAD TRANSPORTING APPARATUS

CROSS-REFERENCE TO RELATED APPLICATIONS

This application is a continuation of U.S. patent application Ser. No. 13/711,315, filed Dec. 11, 2012, now U.S. Pat. No. 8,490,724, issued Jul. 23, 2013, which claims priority to U.S. Provisional Application No. 61/576,657, filed Dec. 16, 2011, entitled METHOD AND APPARATUS FOR TRANSPORTING A LOAD, the contents of which are hereby incorporated by reference. This application is related to U.S. patent application Ser. No. 13/711,193, filed Dec. 11, 2012, now U.S. Pat. No. 8,573,334, issued Nov. 5, 2013 entitled ROTATION DEVICE FOR LOAD TRANSPORTING APPARATUS, the contents of which are hereby incorporated by reference. This application is also related to U.S. patent application Ser. No. 13/711,269, filed Dec. 11, 2012, now U.S. Pat. No. 8,561,733, issued Oct. 22, 2013 entitled ALIGNMENT RESTORATION DEVICE FOR LOAD TRANSPORTING APPARATUS, the contents of which are hereby incorporated by reference.

FIELD OF THE INVENTION

This disclosure relates generally to apparatuses for transporting a load, and more particularly to centering devices for apparatuses used to move heavy loads over small distances with the ability to fine tune the resultant position of the heavy load.

BACKGROUND

Moving extremely heavy loads has generally been a complicated task because the large forces involved in lifting and transporting the heavy loads. When possible, large loads are often transported by disassembling or breaking up the load into multiple smaller loads. However, this break-down and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled wells in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Reed and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area. However, this disclosed system in the '525 patent does not allow for movement of heavy load in a direction perpendicular to the long axis of the support beams. That is, movement of the heavy load is restricted in the walking device disclosed in the '525 patent to only particular directions, which can make fine tuning of the position of the heavy load difficult.

SUMMARY

Embodiments of the present invention are directed to a load transporting apparatus that automatically centers a support foot of the apparatus about a roller assembly during a recovery phase of an incremental walking movement. In particular, the load transporting apparatus includes guide devices positioned adjacent to a roller assembly that deflect a biasing device during non-linear load transporting movements, where the biasing device acts to automatically return the support foot to a centered position relative to the roller assembly after a non-linear movement has been completed and the support foot is raised above a ground surface.

BRIEF DESCRIPTION OF THE DRAWINGS

FIG. 7 is a perspective view of an example walking apparatus according to embodiments of the invention.

FIG. 9 is a perspective view of another example walking apparatus according to embodiments of the invention.

DETAILED DESCRIPTION

As described above, walkers, or walking machines, are vehicles that are used for transporting very heavy loads, such as entire oil well drilling rigs. Such loads may be as great as several thousand tons and may be required to be sequentially positioned very precisely over spaced-apart well bores, for example. Embodiments of the present concept are directed to load transporting apparatuses, such as walking machines, for moving heavy loads over small distances with the ability to fine tune the resultant position of the heavy load. For ease of understanding, the terms, "walkers," "walking machines," "walking devices," and "walking apparatuses" are used interchangeably below. Load transporting apparatuses or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

Figure 1A:
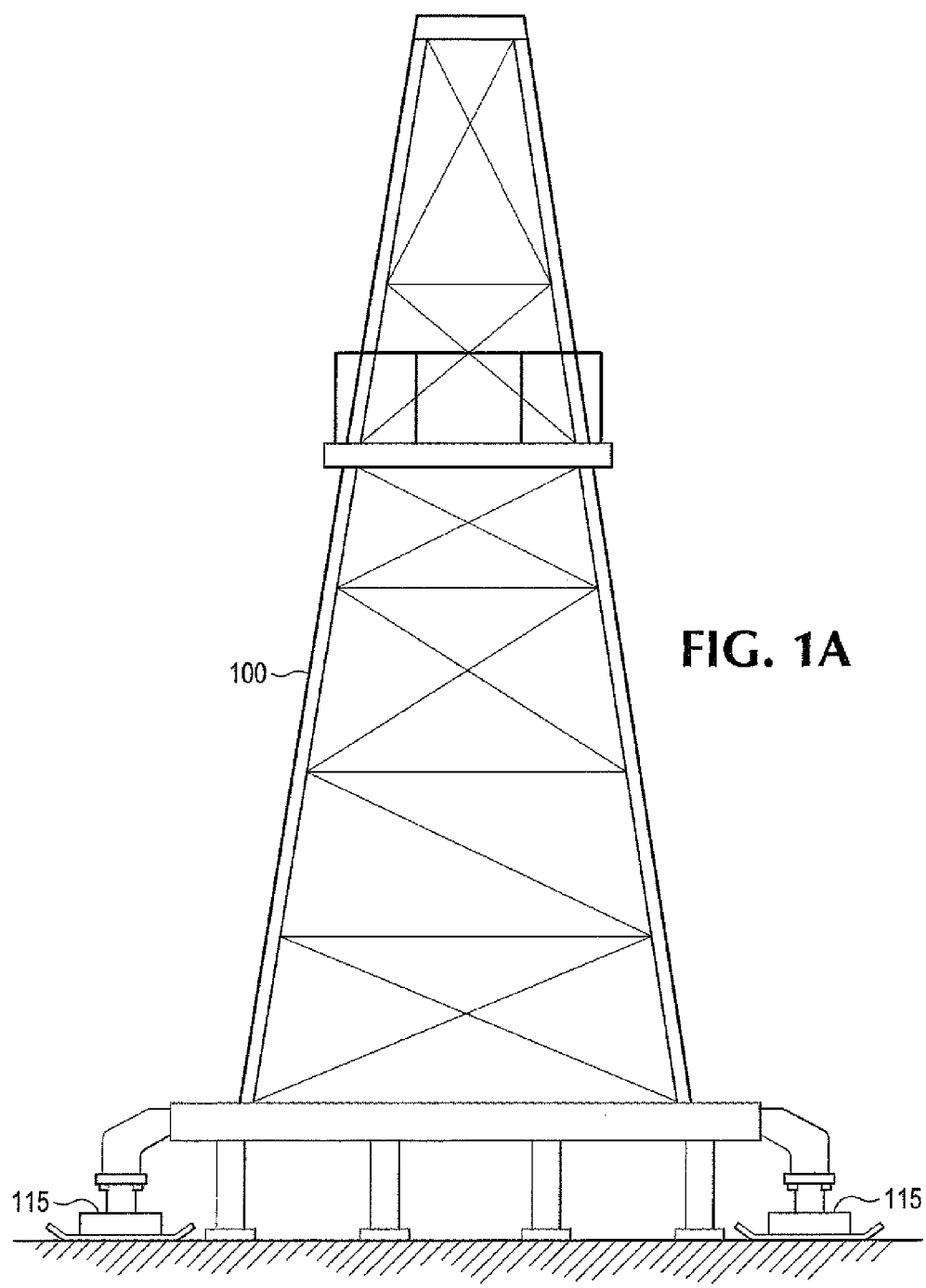
FIGS. 1A and 1B are diagrams of walking apparatuses attached to various loads according to embodiments of the invention.
Figure 1B:
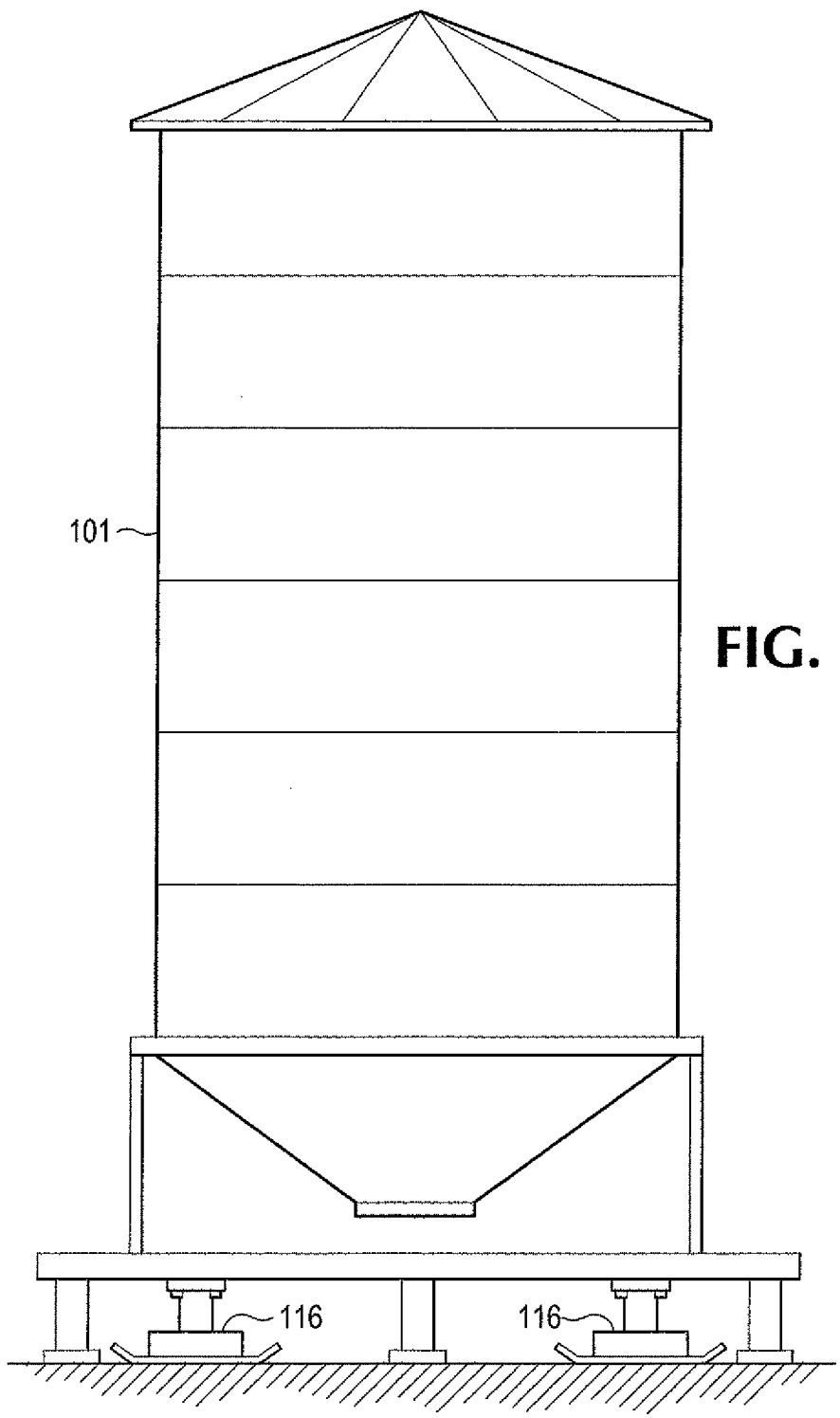

For example, with reference FIGS. 1A and 1B, a load transporting system includes multiple walking machines that support a load being carried by the load transporting system. FIGS. 1A and 113 show examples of walking apparatuses attached to various loads according to embodiments of the invention. Referring to FIG. 1A, multiple walking apparatuses 115 are positioned under or adjacent to an oil rig 100. Typically, walking machines 115 are positioned at least near edge portions of a load 100 to balance the weight of the load over the various walking machines. However, specific situations may dictate that walking machines 115 are positioned in various other locations relative to the load 100.

Referring to FIG. 1B, multiple walking apparatuses 116 are positioned under or adjacent to a silo 101. Although an oil rig load 100 and a silo 101 are respectively illustrated in FIGS. 1A and 113, walking machines may be used to move any type of relatively large load, such as bridge sections, ship sections, structures, etc. Additionally, although two walking machines are shown in FIGS. 1A and 1B, more or fewer walking machines may be used to move loads 100, 101.

Figure 2A:
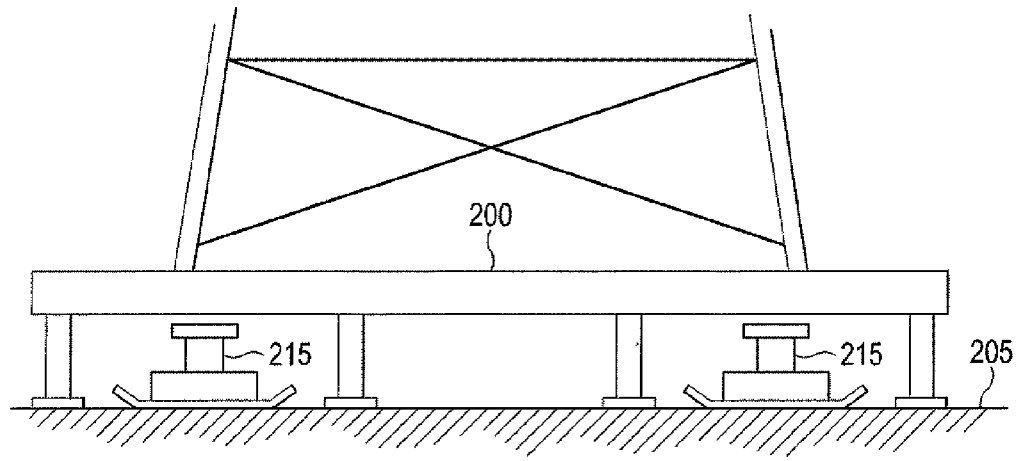
FIGS. 2A, 2B, 2C, 2D, 2E, and 2F are detail diagrams showing an example operational progression of walking apparatuses to move a load according to embodiments of the invention.
Figure 2B:
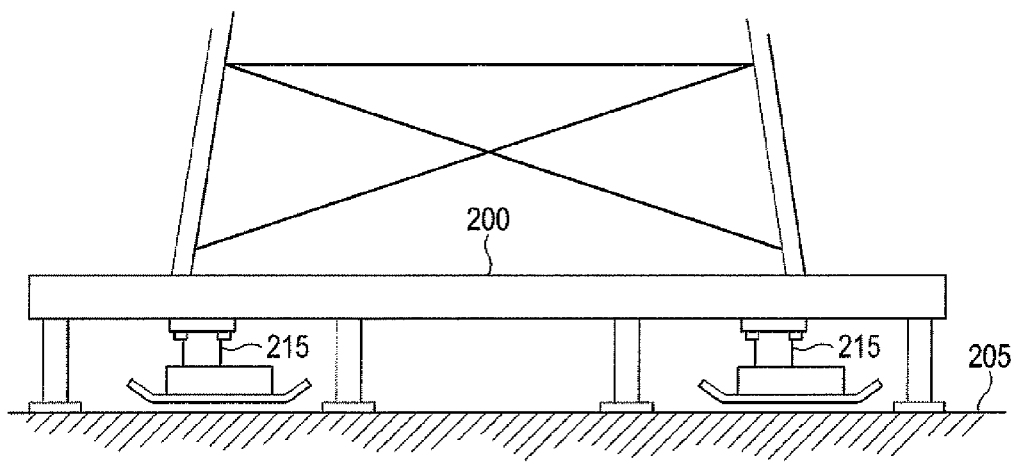
Figure 2C:
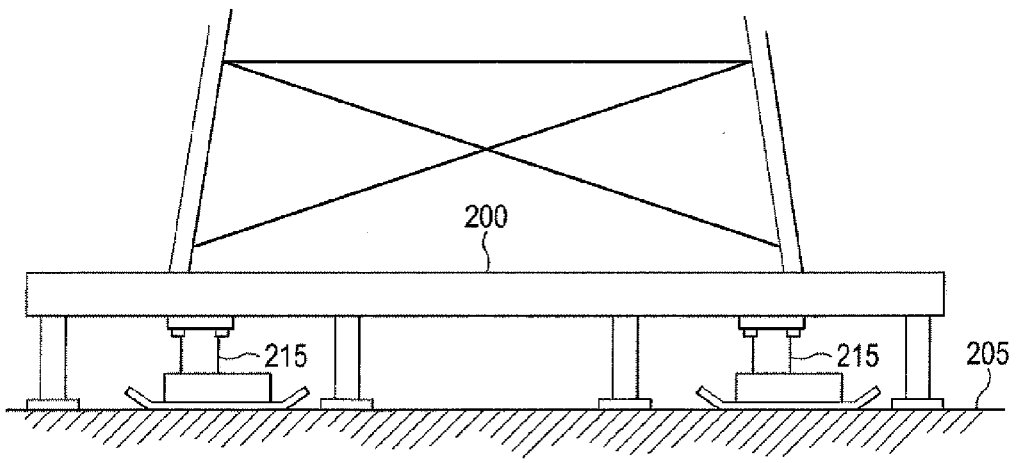

FIGS. 2A-2F provide an overview of an example operation of walking apparatuses to move a load according to embodiments of the invention. Referring to FIG. 2A, walking apparatuses 215 are positioned on a base surface 205 below or adjacent to a load 200. Referring to FIG. 2B, the walking apparatuses 215 are attached to the load 200, and are positioned above a base surface 205. As described below, there are many possible connection variations that can be used to connect the walking apparatuses to a load 200. Referring to FIG. 2C, the walking apparatuses 215 are operated so that a foot portion of the walking apparatus contacts the base surface 205. The walking apparatuses 215 may be operated substantially simultaneously, or may be operated in intervals depending on the conditions of the base surface 205 and the load 200 that is to be moved.

Figure 2D:
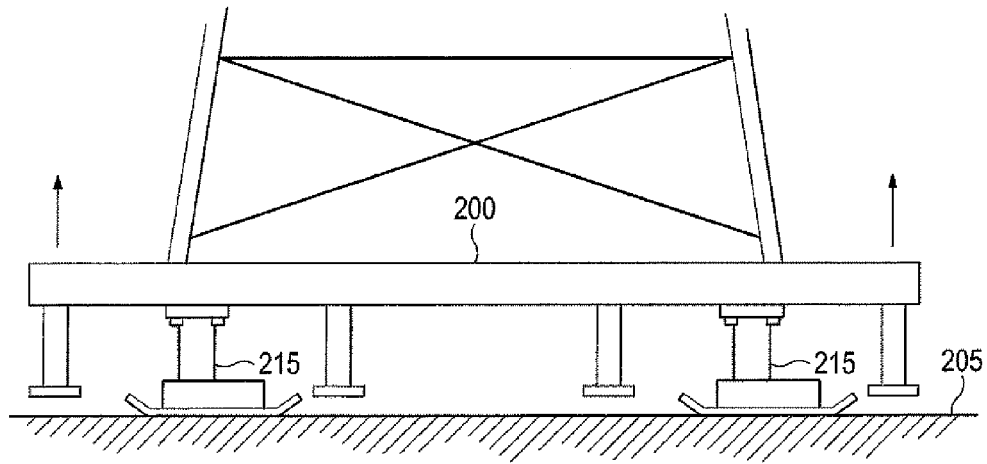

Referring to FIG. 2D, the walking apparatuses 215 are operated to lift the load 200 above the base surface 205. The walking apparatuses 215 may again be operated substantially simultaneously to lift the load 200, or may be operated in intervals depending on the conditions associated with the desired move.

Figure 2E:
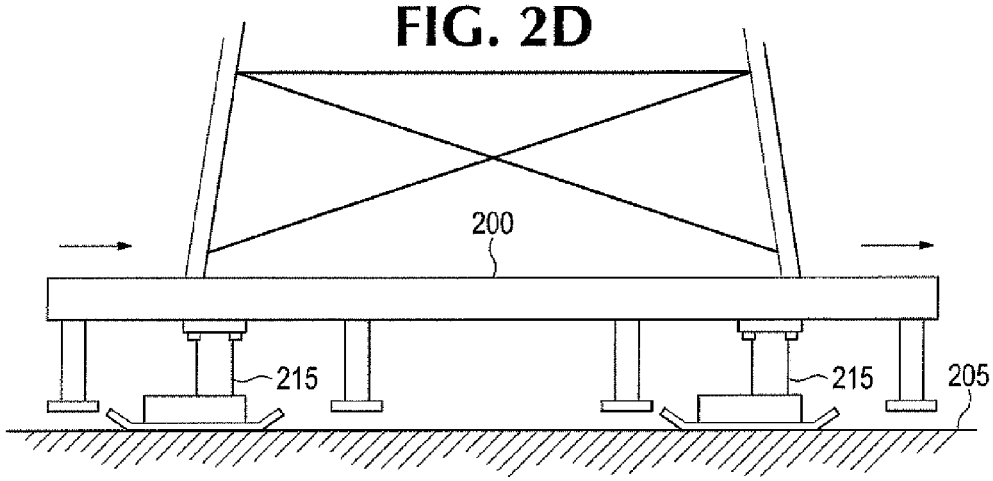
Figure 2F:
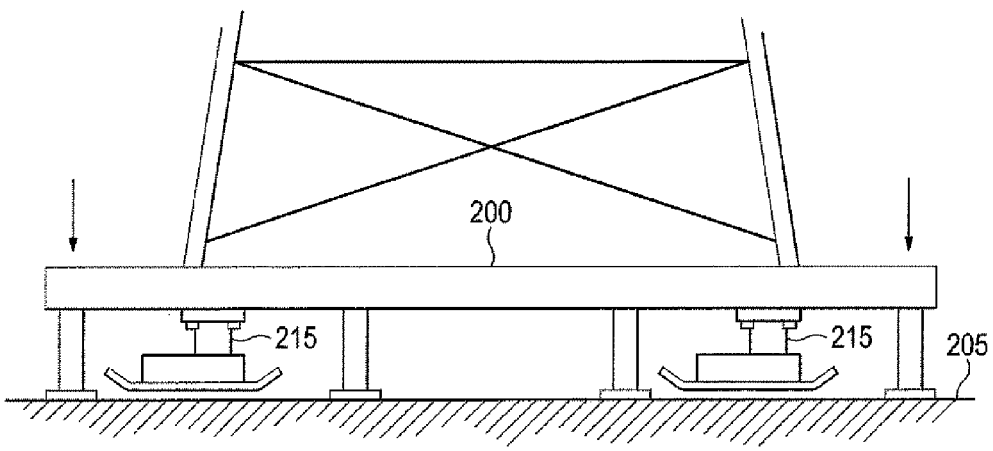

Referring to FIG. 2E, the walking apparatuses 215 are operated to move the load 200 to the right. Although FIG. 2E shows the load 200 being moved to the right, the walking apparatuses can be operated to move the load in a variety of directions depending on the desired final location of the load. Referring to FIG. 2F, the walking apparatuses 215 are operated to lower the load 200 to the base surface 205 and to raise the foot portions of the walking apparatuses above the base surface. That is, after the load 200 is positioned on the base surface 205, the walking apparatuses 215 are further operated so that they are raised above the base surface. Here, the connection between the walking apparatuses 215 and the load 200 support the walking apparatuses 215 when they are raised above the base surface 205. After the walking apparatuses 215 are raised above the base surface 205, they are further operated to be repositioned for another movement walking step, such as by moving the foot portions of the walking apparatuses to the right so that they are in a position as shown in FIG. 2B. That is, the base surface touching part of the walking apparatuses 215 (e.g., the support foot and related structures) is moved to the right while the walking apparatuses 215 are raised above the base surface 205. After the walking apparatuses 215 have been repositioned, they are operated to be lowered to the base surface 205 as shown in FIG. 2C. This completes a single walking cycle, and further walking cycles or steps can be performed by repeating the steps described above with respect to FIGS. 2D to 2F.

Figure 3A:
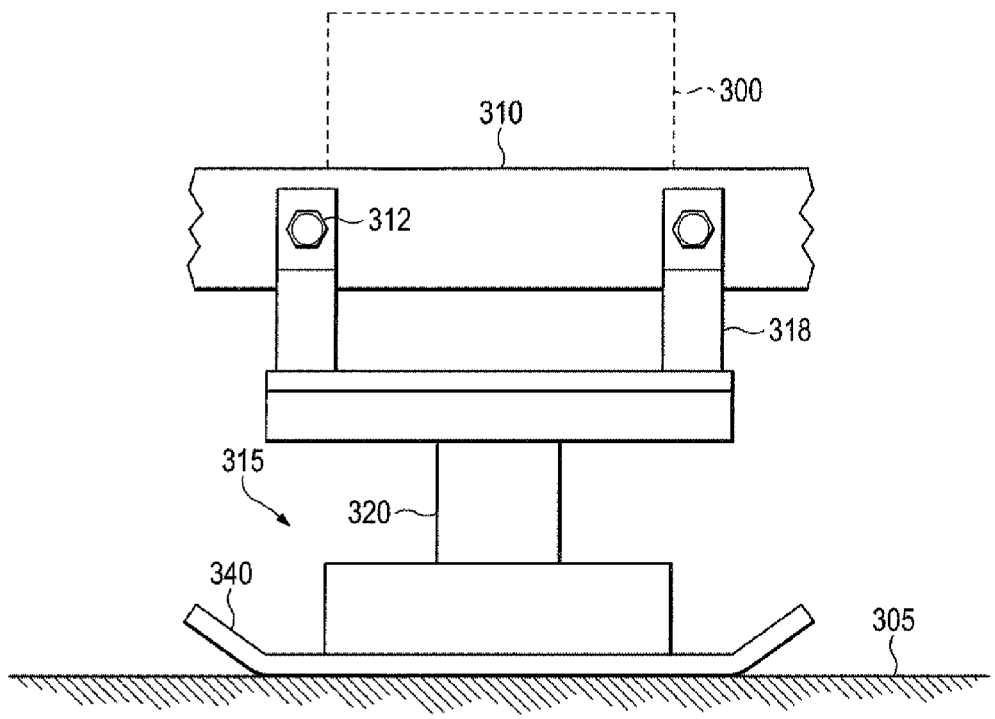
FIGS. 3A and 3B are diagrams illustrating example connection arrangements used to connect a walking apparatus to a load according to embodiments of the invention.
Figure 3B:
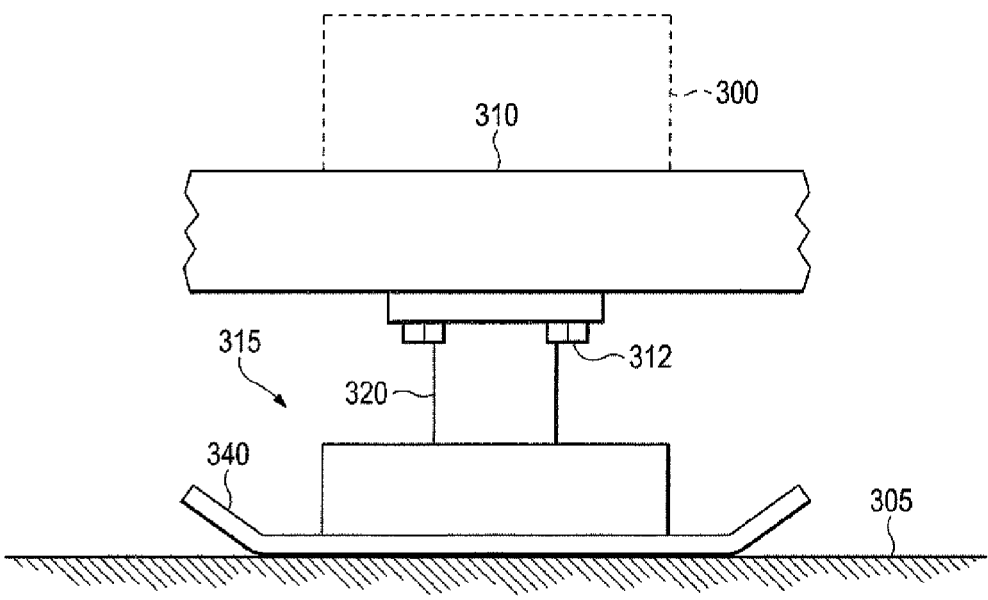

As mentioned above, walking apparatuses can be connected to loads in a variety of ways depending on the specific conditions surrounding the load. FIGS. 3A and 3B illustrate two such connection schemes. Although two connection schemes are illustrated in FIGS. 3A and 3B, embodiments of the invention are not limited to such connection schemes, as many different connection variations exist and are included in the scope of this concept.

Referring to FIG. 3A, a walking apparatus 315 includes a support foot 340 to interface with a base surface 305 and a lift mechanism 320 to raise and lower a load 300. In the embodiment shown in FIG. 3A, the lift mechanism 320 of the walking apparatus 315 is attached to a connection frame 318, which in turn is bolted to framework 310 supporting the load 300 with bolts 312 or other connection mechanisms. In some embodiments, the connection frame 318 may be part of the walking apparatus 315 and in some instances, may be permanently welded, bolted, or otherwise connected to the lift mechanism 320 of the walking apparatus. In other embodiments, the connection frame 318 may be separate from the walking apparatus 315, and may only be temporarily used with the walking apparatus in certain situations. In these embodiments, for example, multiple different connection frames 318 may be built or used with specific load conditions or specifications.

FIG. 3B shows different embodiments where the portions of a lift mechanism 320 of a walking apparatus 315 are directly connected to a support frame 310 structured to support a load 300 with bolts 312 or other connection mechanisms. The support frame 310 may be considered part of the load 300 in some instances where it is a permanent part of the load structure. For example, in instances where the load is a silo, such as shown in FIG. 1B, the metal frame of the silo may be considered the support frame 310 of the load 300, while also being part of the silo, and hence part of the load. In other cases, the support framework 310 may be an ancillary structure that is only used to stabilize and support the load 300 during movement of the load.

Figure 4:
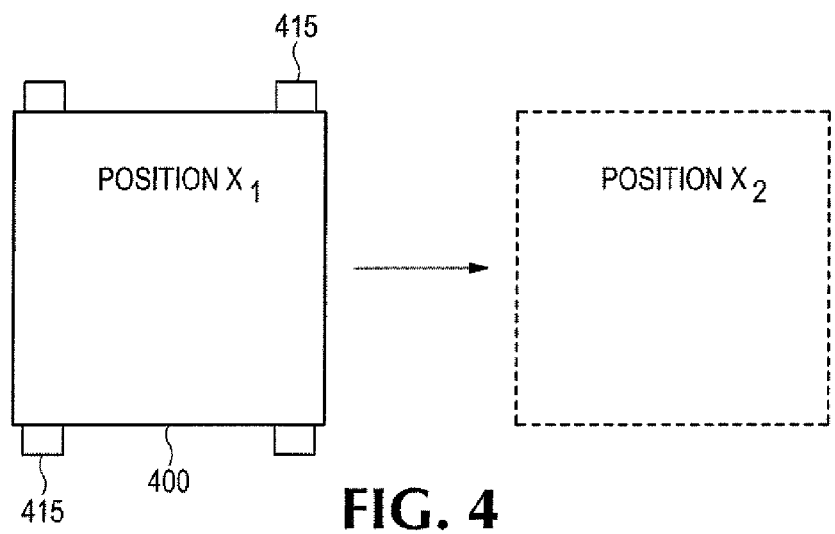
FIG. 4 is a schematic diagram illustrating movement of a load along a substantially linear path according to embodiments of the invention.

FIG. 4 is a schematic diagram illustrating movement of a load along a substantially linear path according to embodiments of the invention. Referring to FIG. 4, a load 400 is connected to multiple walking apparatuses 415, which are used to move the load from an initial position $X_1$ to a final position $X_2$ along a substantially linear path. Here, that path is a horizontal path moving from left to right. This type of basis linear movement can be accomplished by a variety of walking systems.

Figure 5:
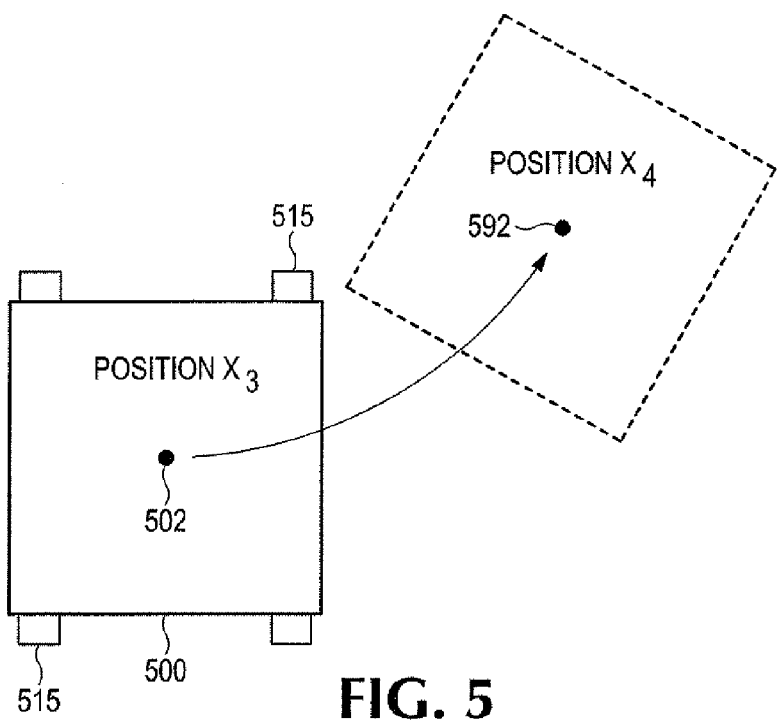
FIG. 5 is a schematic diagram illustrating movement of a load along a curved path according to embodiments of the invention.

FIG. 5 is a schematic diagram illustrating movement of a load along a curved path according to embodiments of the invention. Referring to FIG. 5, a load 500 is connected to multiple walking apparatuses 515, which are used to move the load from an initial position $X_3$ to a final position $X_4$ along a non-linear path. Here, a reference center-point 502 of the load 500 at the initial position $X_3$ is moved to a reference center-point 592 of the load 500 at the final position $X_4$. Unlike the linear movement shown in FIG. 4, this curved path of travel shown in FIG. 5 requires that the walking apparatuses be steered, which can be accomplished using embodiments of the inventive walking apparatuses described below.

Figure 6:
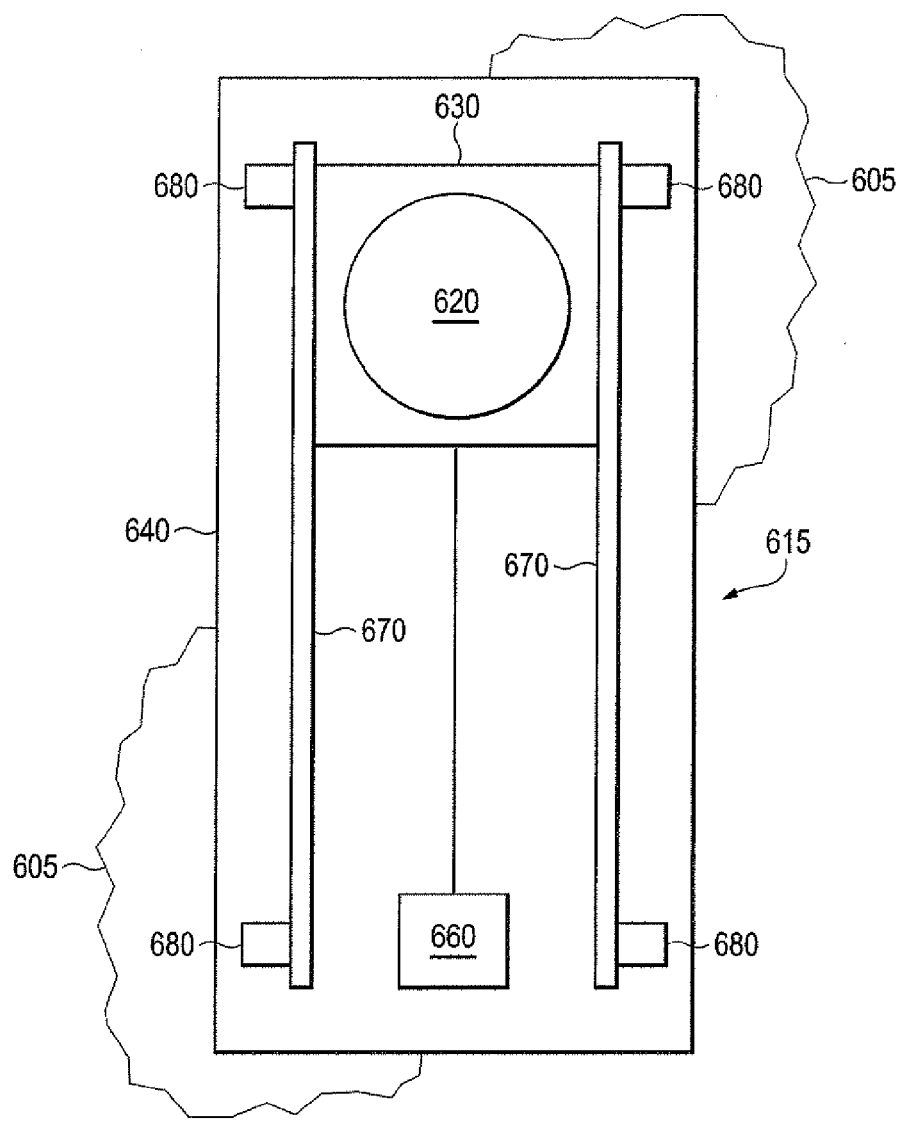
FIG. 6 is a schematic diagram of a top view of a walking apparatus according to embodiments of the invention.

FIG. 6 is a schematic diagram of a top view of a walking apparatus according to embodiments of the invention. Referring to FIG. 6, a load transporting apparatus 615 is configured to move a load (e.g., element 100 FIG. 1) over a base surface 605 in one or more incremental steps each including a load-movement phase and a recovery phase. The load transporting apparatus 615 includes a lift mechanism 620 structured to lift a load-bearing frame 610 supporting the load and a support foot 640 connected to the lift mechanism, the support foot structured to interface with the base surface 605. A roller assembly 630 is also coupled to the lift mechanism 620. A travel mechanism 660 is coupled to the roller assembly 620, and is structured to displace the roller assembly relative to the support foot 640. The load transporting apparatus also includes one or more guide devices 670 positioned adjacent to the roller assembly 630 and configured to guide the roller assembly during movement caused by the travel mechanism 660. One or more biasing devices 680 are coupled to the guide devices 670, where the biasing devices are structured to become activated during a load-movement phase when the roller assembly 630 is non-linearly displaced by the travel mechanism 660 relative to a set direction of travel. The biasing devices 680 are further structured to return the support foot 640 to a centered position relative to the roller assembly 630 about the longitudinal center line of the support foot during a recovery phase.

In some embodiments, the biasing devices 680 are temporarily or permanently fixed to the support foot 640. The orientation of the support foot 640 in these embodiments may determine the set direction of travel. That is, the support foot 640 may be positioned or set in a desired direction of travel prior to the start of a walking cycle. Here, the guide devices 670 may be coupled to the biasing devices 680, and be moveable with respect to the support foot 640. Hence, as the roller assembly 630 is displaced by the travel mechanism 660, one or more of the guide devices may be displaced relative to the support foot 640 by pressing or pulling against one or more of the biasing devices 680. In other embodiments, the guide devices 670 are temporarily or permanently fixed to the support foot 640. Here, the biasing devices may be coupled to the roller assembly 630 and move with roller assembly as it is displaced by the travel mechanism 660. Hence, if the roller assembly 630 is moved in a non-linear direction with respect to a centerline of the support foot 640 or the guide devices 670, the biasing devices 680 may become compressed or extended to allow this displacement.

In some embodiments, the one or more guide devices 670 include guide bars positioned on opposite sides of the roller assembly 630. The guide bars of the guide devices 670 may be structured to be substantially parallel with the longitudinal center line of the support foot 640. Here, the roller assembly 630 deflects at least one of the guide bars 670 when movement of the roller assembly by the travel mechanism 660 deviates from the longitudinal centerline of the support foot 640. That is, the roller assembly 630 deflects at least one of the guide bars 670 when the load is displaced in a non-linear movement, such as a spin motion. When the load transporting apparatus 615 is placed in a spin motion, the lift cylinder 620 must move in a circular path as the roller assembly 630 is aligned in a straight path between guide bars 670. Hence, there is a relative motion between the lift cylinder 620 and the centerline of the support foot 640.

As shown in co-pending application Ser. No. 13/711,193 entitled ROTATION DEVICE FOR LOAD TRANSPORTING APPARATUS, the contents of which are incorporated herein in their entirety, the load transporting apparatus 615 may further include a roller track (see e.g., element 650 in FIG. 6A of the above co-pending application), where the support foot 640 is directly coupled to the roller track. Here, the roller track (650) may be coupled to the support foot with a rotation pin (655, FIG. 6A of the above co-pending application), such as a king pin connection device. In embodiments having these features, the rotation pin (655) may allow the roller track (650) to rotate with respect to the support foot 640. Hence, the roller track (650) may be oriented or set in a desired direction of travel even when the support foot 640 is oriented in a different direction. The roller assembly 630 may be positioned on the roller track (650) and displaced relative to the roller track.

Here, the biasing devices 680 may be connected to the roller track (650) rather than the support foot 640. In some embodiments, the guide device 670 includes two guide bars positioned on opposite sides of the roller assembly 630 and oriented substantially parallel to the longitudinal center line of the roller track (650), which determines the set direction of travel. In these embodiments, the roller assembly 630 deflects at least one of the guide bars 670 when movement of the roller assembly by the travel mechanism 660 deviates from the longitudinal centerline of the roller track 650 (i.e., deviates from the set direction of travel).

In these and other embodiments, the biasing devices 680 may include spring devices respectively coupling the guide devices 670 to the support foot 640. These spring devices may include one or more of leaf springs, coil springs, torsion springs, air springs, or any other type of device that includes an elastic property. In other embodiments, the biasing devices 680 may include hydraulic cylinders with accumulators.

FIG. 6 is presented in a schematic style view as many possible variations in the appearance and mechanical structure of the load transporting apparatus 615 exist. FIG. 7 provides a more detailed view of one embodiment of a load transporting apparatus. FIG. 7 is a perspective view of an example walking apparatus according to embodiments of the invention Referring to FIG. 7, a load transporting or walking apparatus 715 includes a lift mechanism 720, a roller assembly 730, and a support foot 740. The lift mechanism 720 may include a hydraulic jack suspended from a horizontal beam of the load-bearing frame 310 (FIGS. 3A and 3B).

The lift mechanism 720 may include a lift cylinder 720 that is connected to a load-bearing frame 710, and a cylinder rod 722 coupled to the roller assembly 730. Here, the cylinder rod 722 may be structured to allow the roller assembly 730 to rotate about a substantially vertical axis in the center of the cylinder rod. That is, the roller assembly 730 may be free to rotate around the cylinder rod 722. The connection between the roller assembly 730 and the cylinder rod may be a bearing or one of a number of different connection variations. In one embodiment, the cylinder rod 722 may include a groove (not shown) around side edges of a lower portion of the cylinder rod, where the groove corresponds to a retainer cuff (not shown) of the roller assembly 730. In this example the retainer cuff is rotatable around the groove, but may easily be assembled or disassembled during installation, break-down, or transportation of the walking apparatus 715.

Although the embodiment shown in FIG. 7 shows the lift cylinder 721 connected to the load bearing frame 710 and the cylinder rod 722 connected to the roller apparatus 730, in other embodiments, the cylinder rod may be connected to the load-bearing frame, and the lift cylinder may be connected to the roller apparatus. In these other embodiments, the cylinder may be structured to allow the roller assembly to rotate about a substantially vertical axis.

The walking apparatus 715 may also include a travel mechanism 760 that is connected to the support foot 740 and coupled to the roller assembly 730 such that when the travel mechanism is activated, the roller assembly moves relative to the support foot. In some embodiments, the travel mechanism 760 is attached to the support foot with a pin connection 762 and pivot rod 765 to allow the travel mechanism 760 to rotate relative to the support foot. The travel mechanism 760 may also be coupled to the roller assembly 730 with a pin connection to allow the roller assembly to pivot relative to the travel mechanism.

Although the travel mechanism 760 is shown as a single cylinder in FIG. 7, the travel mechanism may include two or more travel cylinders in other embodiments. In other embodiments, the travel mechanism 760 may include different movement structures, such as pulleys, levers, winches, tracks, etc.

In the embodiments shown in FIG. 7, the roller assembly 730 may include a plurality of rollers or roller chain that rotate as well as roll on the roller track 750. That is, in some embodiments, the roller assembly 730 may include a WBOT series roller assembly from Hilman Rollers. Due to the configuration of the roller chain of the roller assembly 730 and the tolerance between the roller assembly and the support foot 740 of the walking machine 715, the rollers of the roller chain will typically be engaged with the support foot 740 during operation and use of the walking machine.

The roller assembly 730 may be secured to the lower end of the lift mechanism 720, with the roller assembly being captured within a U-shaped track created in part by the guide devices 770. The roller assembly 730 may be configured to roll along the bottom inside surface of the support foot 740 as well as along the underside of two upper flanges (not shown for clarity purposes) that hold the roller assembly and support foot 740 when the walking apparatus 715 is raised above the ground surface 705 by the lift mechanism 720 during the recovery phase of a walking cycle. As will be understood from the more detailed discussion below, the travel mechanism 760 permits for the translation of the support foot 740 relative to the lift mechanism 720 and vice versa.

As shown in FIG. 7, guide devices 770 are positioned on either side of the roller apparatus and extend along a travel path of the roller assembly in a direction substantially parallel to the direction of travel. The guide devices 770 may include stops on either end to help restrict the movement of the roller assembly 730. In addition, the guide devices 770 may include outward-facing tabs to interface with biasing devices 780. In this illustrated embodiment, the biasing devices 780 are leaf springs that are attached to spring stops 785 at either end of the leaf springs. The spring stops 785 are further fixed to the support foot 740 to provide fixed points of reference for the leaf springs 780. In operation, which is discussed in additional detail below with reference to FIGS. 8A-8D, the leaf springs 780 are deflected outward when the roller assembly 730 pushes against and shifts the guide devices 770. The leaf springs 780 may include steel, plastic, or any other type of material that can deflect without permanently damaging the material (i.e., without reaching a plastic region of the material's stress-strain curve).

As discussed above, in other embodiments a roller track (650) may be included in the walking apparatus 815 and positioned between the roller assembly 830 and the support foot 840. For ease of understanding in FIG. 7 (and FIGS. 8A-8D below) this other embodiment can be easily visualized by replacing the references to support foot for element 840 with references to a roller track. Hence, this embodiment would simply use element 840 as the roller track and an additional element in a support foot under the roller track as shown in, for example, FIG. 6A of co-pending application Ser. No. 13/711,193 entitled ROTATION DEVICE FOR LOAD TRANSPORTING APPARATUS. Here, as discussed above, the roller track may be secured to the elongate ground-engaging foot 740 (support foot) via a rotational pin (755), which enables the roller track to be rotationally positioned relative to the foot for steering of the walking machine 715.

FIGS. 8A, 8B, 8C, and 8D are diagrams illustrating an example operation progression of the walking apparatus shown in FIG. 7 according to embodiments of the invention.

Figure 8A:
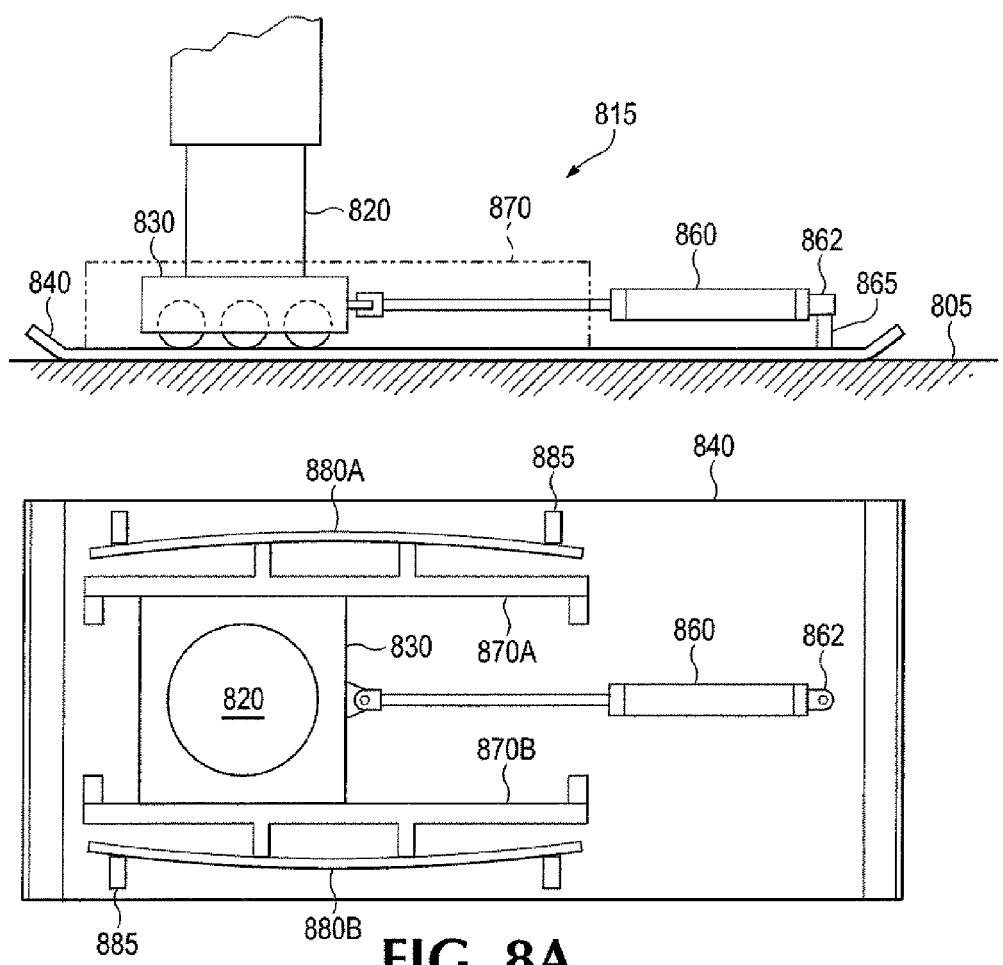
FIGS. 8A, 8B, 8C, and 8D are diagrams illustrating an example operation progression of the walking apparatus shown in FIG. 7 according to embodiments of the invention.

Referring to FIG. 8A, a walking apparatus 815 includes a lift cylinder 820, roller assembly 830, travel mechanism 860, and support foot 840 as described above with reference to FIG. 7. Briefly, the travel mechanism, which is fixed to the support foot 840 with a pin connection 862 and pivot rod 865, is configured to displace the roller assembly 830 relative to the support foot 840 during the load-movement phase of a walking cycle when the walking apparatus is engaged with a ground surface 805 and a load is lifted above the ground surface by the lift mechanism 820.

As discussed above with respect to FIG. 7, the walking apparatus 815 also includes guide devices 870A, 870B positioned on either side of the roller assembly 830, and biasing devices 880A, 880B, such as leaf springs, engaged with the respective guide devices. The leaf springs 880A, 880B are further fixed at end portions to spring stops 885, which are attached to the support foot 840. In FIG. 8A, the walking apparatus 815 is shown at a point in the load-movement phase of a walking cycle prior to movement of the load.

Figure 8B:
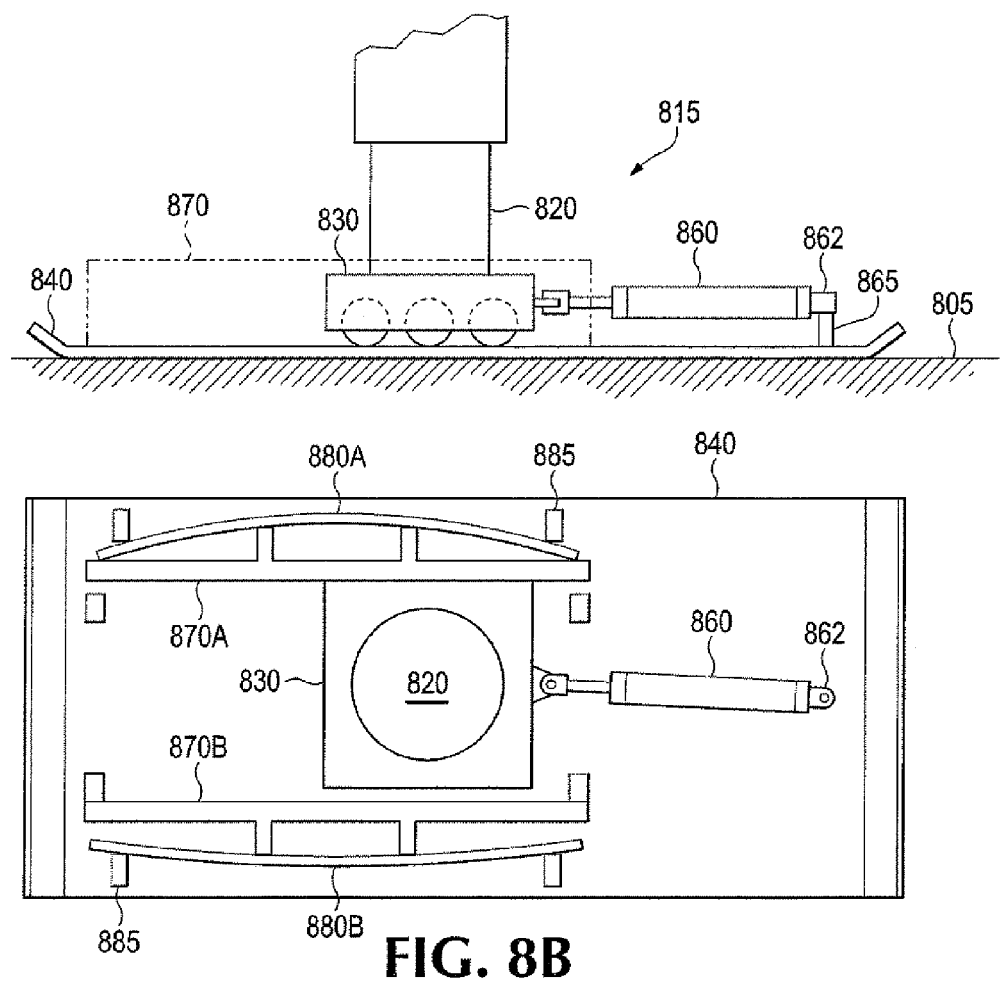

Referring to FIG. 8B, a spin movement or other non-linear movement is made by the walking apparatus 815 as part of the load-movement phase of a walking cycle. Here, the travel mechanism 860 is activated to pull the roller assembly 830 toward the travel mechanism. In this instance, because the movement was non-linear, the roller assembly deviates from a set direction of travel (i.e., the orientation of the lengthwise direction of the support foot 840) and presses against the upper guide device 870A. By pressing against the upper guide device 870A, the roller assembly 830 shifts the guide device upward into the upper biasing leaf spring 880A. This upward shift of the guide device 870A deflects the upper leaf spring 880A. Note that the roller assembly may become separated from the other guide device 870B (lower guide device in this example) when shifting one of the guide devices 870A. Note also, that the non-linear movement of the roller assembly 830 may not be caused solely based on the pulling force of the travel mechanism 860, but rather may be due to the movement of multiple walking apparatuses that are oriented in different directions to accomplish a spin movement, or other steering movement, as shown, for example, in FIG. 10D of the co-pending application Ser. No. 13/711,193 entitled ROTATION DEVICE FOR LOAD TRANSPORTING APPARATUS.

Figure 8C:
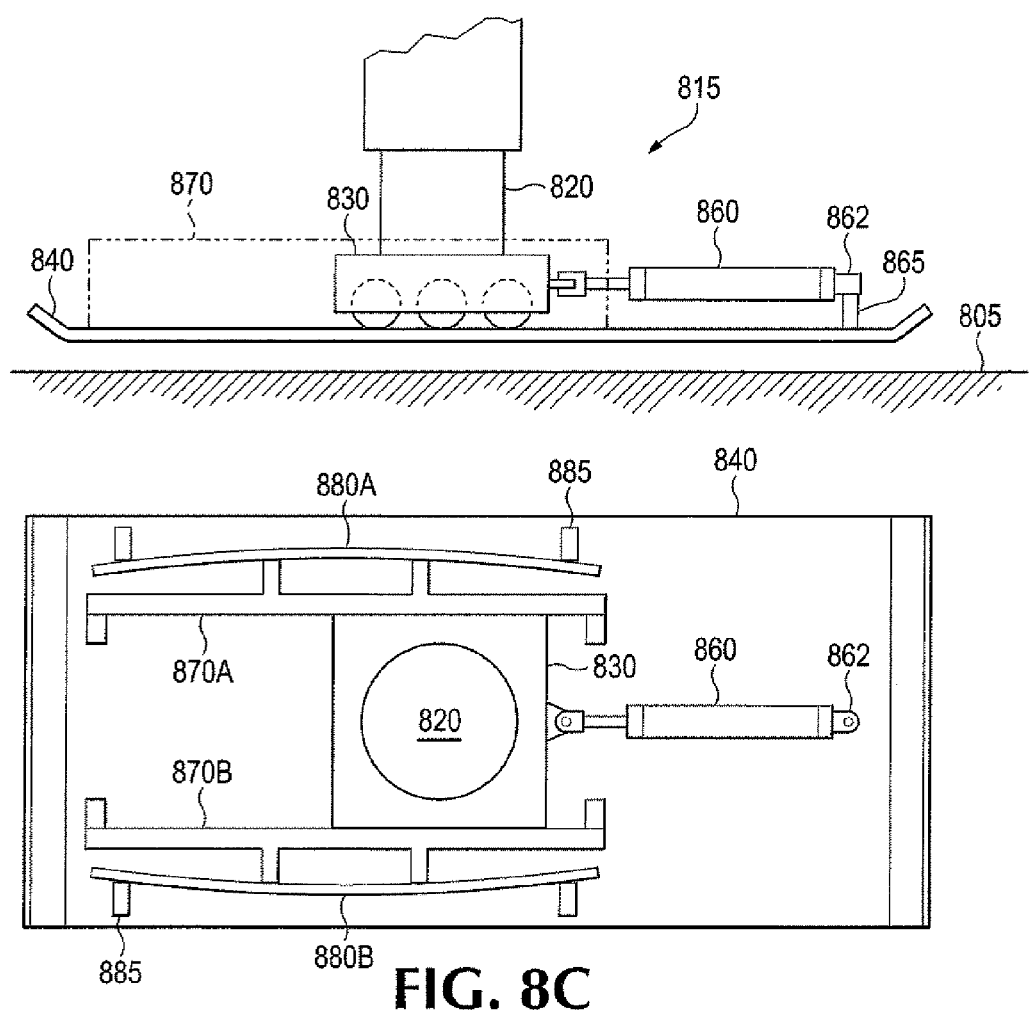

Referring to FIG. 5C, the lift mechanism 820 is activated to lower the load to the ground surface 805 and lift the walking apparatus 815 above the ground surface. As the support foot 840 loses contact with the ground surface 805, the upper deflected leaf spring 880A releases its stored potential energy by shifting the upper guide device 870A back down toward the roller assembly 830. The shifting upper guide device 870A in turn pushes the roller assembly back to a centered position along a set direction of travel or longitudinal centerline of the support foot as shown in FIG. 8C. If this returning centering force from the deflected leaf spring 880A is more than needed to return the roller assembly 830 to a centered position, the lower guide device 870B and lower biasing device 880B help prevent the roller assembly 830 from being pushed back past the centered position. This process shown in FIG. 8C may be part of the recovery phase of a walking cycle.

Figure 8D:
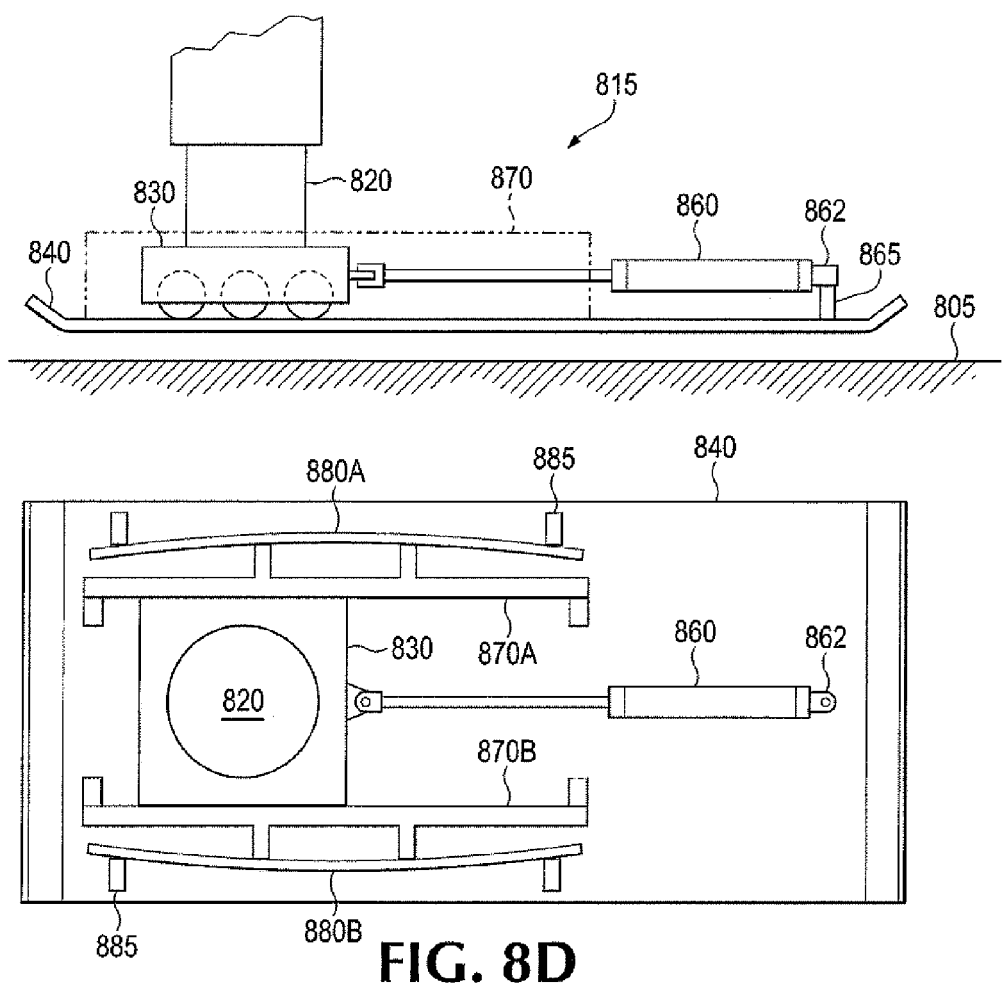

Referring to FIG. 8D, the travel cylinder 860 is activated again to move the support foot 840 forward in the direction of travel (here to the right). This movement repositions the support foot in anticipation of another walking cycle. From here, the lift mechanism would be activated to lower the support foot 840 to the ground surface 805 and raise the load, as shown in FIG. 8A.

FIG. 9 is a perspective view of another example walking apparatus according to embodiments of the invention. The embodiment of FIG. 9 is similar to the embodiment shown in FIG. 7 above except that instead of using a leaf spring 780 as a biasing device, the embodiment in FIG. 9 uses individual coil springs 980.

Referring to FIG. 9, a load transporting or walking apparatus 915 includes a lift mechanism 920, a roller assembly 930, and a support foot 940. The lift mechanism 920 may include a hydraulic jack suspended from a horizontal beam of the load-bearing frame 310 (FIGS. 3A and 3B).

The lift mechanism 920 may include a lift cylinder 920 that is connected to a load-bearing frame 910, and a cylinder rod 922 coupled to the roller assembly 930. Here, the cylinder rod 922 may be structured to allow the roller assembly 930 to rotate about a substantially vertical axis in the center of the cylinder rod. That is, the roller assembly 930 may be free to rotate around the cylinder rod 922. The connection between the roller assembly 930 and the cylinder rod may be a bearing or one of a number of different connection variations. In one embodiment, the cylinder rod 922 may include a groove (not shown) around side edges of a lower portion of the cylinder rod, where the groove corresponds to a retainer cuff (not shown) of the roller assembly 930. In this example the retainer cuff is rotatable around the groove, but may easily be assembled or disassembled during installation, break-down, or transportation of the walking apparatus 915.

Although the embodiment shown in FIG. 9 shows the lift cylinder 921 connected to the load bearing frame 910 and the cylinder rod 922 connected to the roller apparatus 930, in other embodiments, the cylinder rod may be connected to the load-bearing frame, and the lift cylinder may be connected to the roller apparatus. In these other embodiments, the cylinder may be structured to allow the roller assembly to rotate about a substantially vertical axis.

The walking apparatus 915 may also include a travel mechanism 960 that is connected to the support foot 940 and coupled to the roller assembly 930 such that when the travel mechanism is activated, the roller assembly moves relative to the support foot. In some embodiments, the travel mechanism 960 is attached to the support foot with a pin connection 962 and pivot rod 965 to allow the travel mechanism 960 to rotate relative to the support foot. The travel mechanism 960 may also be coupled to the roller assembly 930 with a pin connection to allow the roller assembly to pivot relative to the travel mechanism.

Although the travel mechanism 960 is shown as a single cylinder in FIG. 9, the travel mechanism may include two or more travel cylinders in other embodiments. In other embodiments, the travel mechanism 960 may include different movement structures, such as pulleys, levers, winches, tracks, etc.

In the embodiments shown in FIG. 9, the roller assembly 930 may include a plurality of rollers or roller chain that rotate as well as roll on the roller track 950. That is, in some embodiments, the roller assembly 930 may include a WBOT series roller assembly from Hilman Rollers. Due to the configuration of the roller chain of the roller assembly 930 and the tolerance between the roller assembly and the support foot 940 of the walking machine 915, the rollers of the roller chain will typically be engaged with the support foot 940 during operation and use of the walking machine.

The roller assembly 930 may be secured to the lower end of the lift mechanism 920, with the roller assembly being captured within a U-shaped track created in part by the guide devices 970. The roller assembly 930 may be configured to roll along the bottom inside surface of the support foot 940 as well as along the underside of two upper flanges (not shown for clarity purposes) that hold the roller assembly and support foot 940 when the walking apparatus 915 is raised above the ground surface 905 by the lift mechanism 920 during the recovery phase of a walking cycle. As will be understood from the more detailed discussion below, the travel mechanism 960 permits for the translation of the support foot 940 relative to the lift mechanism 920 and vice versa.

As shown in FIG. 9, guide devices 970 are positioned on either side of the roller apparatus and extend along a travel path of the roller assembly in a direction substantially parallel to the direction of travel. The guide devices 970 may include stops on either end to help restrict the movement of the roller assembly 930. In this illustrated embodiment, the biasing devices 980 are coil springs that are attached to spring stops 985. These coil springs 980 may be positioned near end portions of the guide devices 970 to provide stable deflection during the shifting of the guide devices. The spring stops 985 are further fixed to the support foot 940 to provide fixed points of reference for the coil springs 980. In operation, which is discussed in additional detail below with reference to FIGS. 10A-10D, the coil springs 980 are deflected by compressing toward the spring stops 985 when the roller assembly 930 pushes against and shifts the guide devices 970. The coil springs 980 may include steel, plastic, or any other type of material that can act as spring device.

FIGS. 10A, 10B, 10C, and 10D are diagrams illustrating an example operation progression of the walking apparatus shown in FIG. 9 according to embodiments of the invention.

Figure 10A:
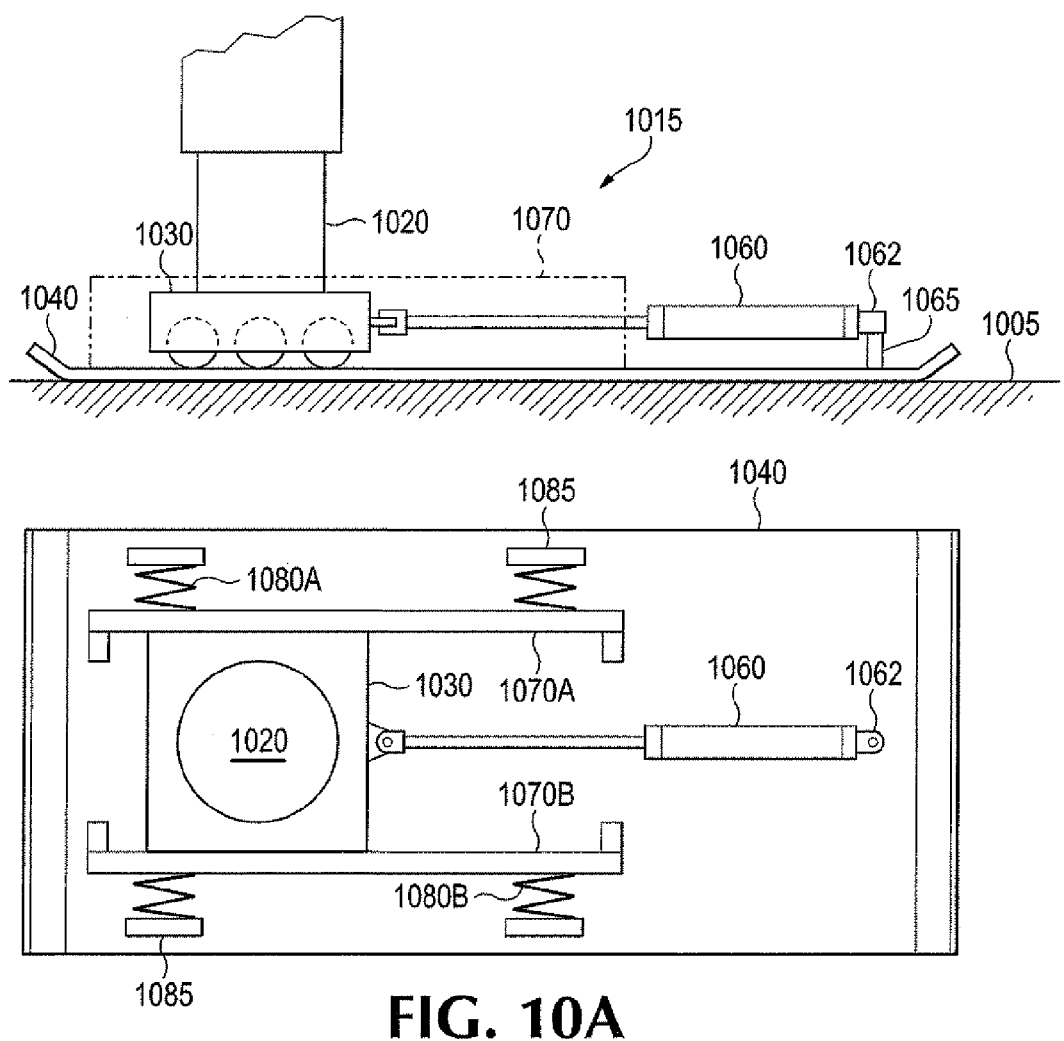
FIGS. 10A, 10B, 10C, and 10D are diagrams illustrating an example operation progression of the walking apparatus shown in FIG. 9 according to embodiments of the invention.

Referring to FIG. 10A, a walking apparatus 1015 includes a lift cylinder 1020, roller assembly 1030, travel mechanism 1060, and support foot 1040 as described above with reference to FIG. 9. Briefly, the travel mechanism, which is fixed to the support foot 1040 with a pin connection 1062 and pivot rod 1065, is configured to displace the roller assembly 1030 relative to the support foot 1040 during the load-movement phase of a walking cycle when the walking apparatus is engaged with a ground surface 1005 and a load is lifted above the ground surface by the lift mechanism 1020.

As discussed above with respect to FIG. 9, the walking apparatus 1015 also includes guide devices 1070A, 1070B positioned on either side of the roller assembly 1030, and biasing devices 1080A, 1080B, such as coil springs, engaged with the respective guide devices. The coil springs 1080A, 1080B are further fixed to spring stops 1085, which are attached to the support foot 1040. In FIG. 10A, the walking apparatus 1015 is shown at a point in the load-movement phase of a walking cycle prior to movement of the load.

Figure 10B:
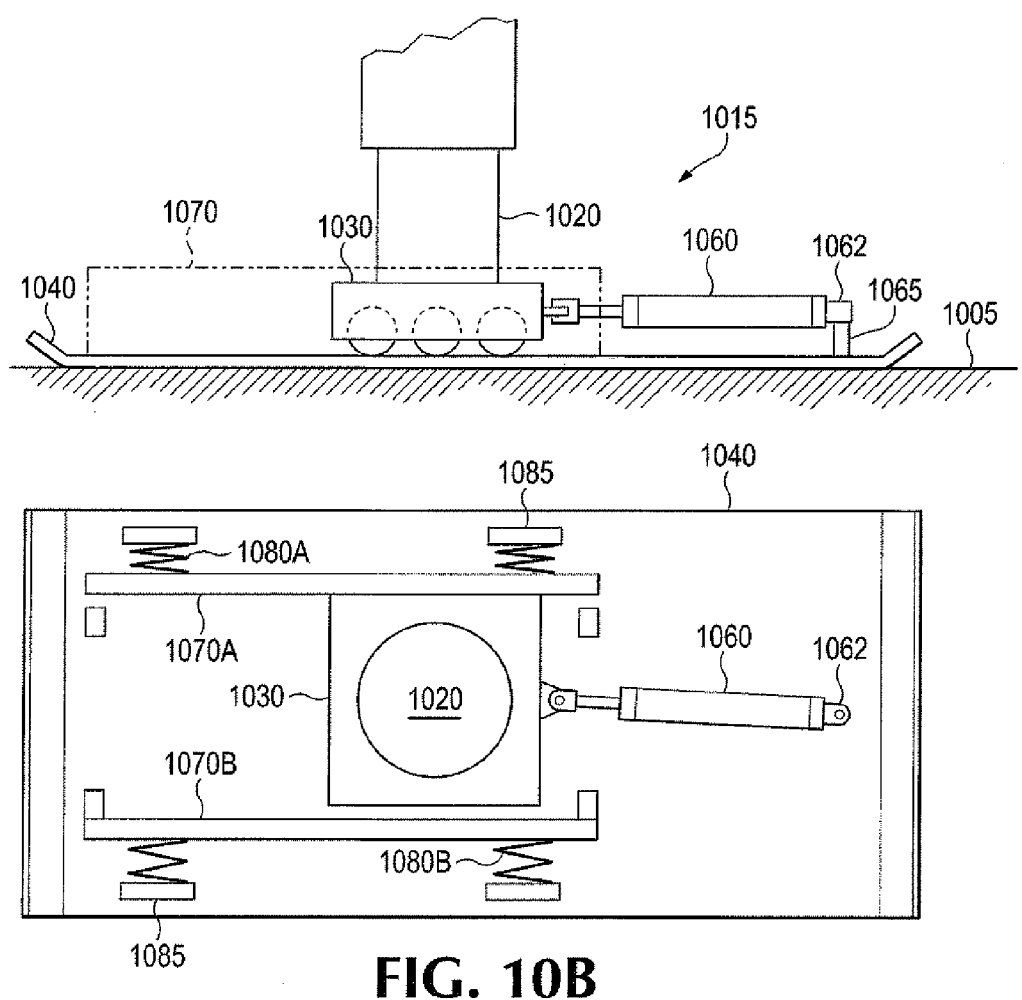

Referring to FIG. 10B, a spin movement or other non-linear movement is made by the walking apparatus 1015 as part of the load-movement phase of a walking cycle. Here, the travel mechanism 1060 is activated to pull the roller assembly 1030 toward the travel mechanism. In this instance, because the movement was non-linear, the roller assembly deviates from a set direction of travel (i.e., the orientation of the lengthwise direction of the support foot 1040) and presses against the upper guide device 1070A. By pressing against the upper guide device 1070A, the roller assembly 1030 shifts the guide device upward into the upper biasing coil springs 1080A. This upward shift of the guide device 1070A compresses the upper coil springs 1080A. Note that the roller assembly 1030 may become separated from the other guide device 1070B (lower guide device in this example) when shifting one of the guide devices 1070A. Note also, that the non-linear movement of the roller assembly 1030 may not be caused solely based on the pulling force of the travel mechanism 1060, but rather may be due to the movement of multiple walking apparatuses 1015 that are oriented in different directions to accomplish a spin movement, or other steering movement, as shown, for example, in FIG. 10D of the co-pending application Ser. No. 13/711,193 entitled ROTATION DEVICE FOR LOAD TRANSPORTING APPARATUS.

Figure 10C:
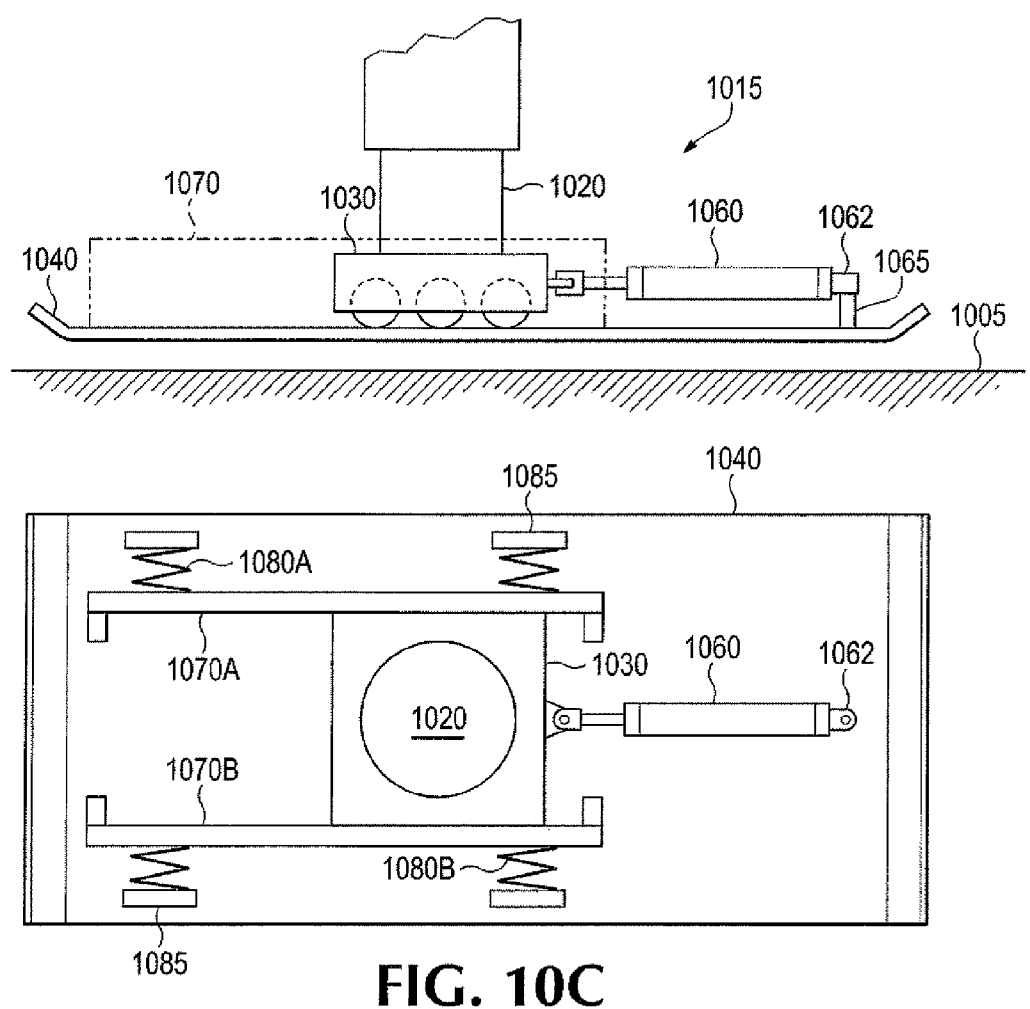

Referring to FIG. 10C, the lift mechanism 1020 is activated to lower the load to the ground surface 1005 and lift the walking apparatus 1015 above the ground surface. As the support foot 1040 loses contact with the ground surface 1005, the upper deflected coil springs 1080A release their stored potential energy by shifting the upper guide device 1070A back down toward the roller assembly 1030. The shifting upper guide device 1070A in turn pushes the roller assembly back to a centered position along a set direction of travel or longitudinal centerline of the support foot as shown in FIG. 10C. If this returning centering force from the deflected coil springs 1080A is more than needed to return the roller assembly 1030 to a centered position, the lower guide device 1070B and lower biasing device 1080B help prevent the roller assembly 1030 from being pushed back past the centered position.

Figure 10D:
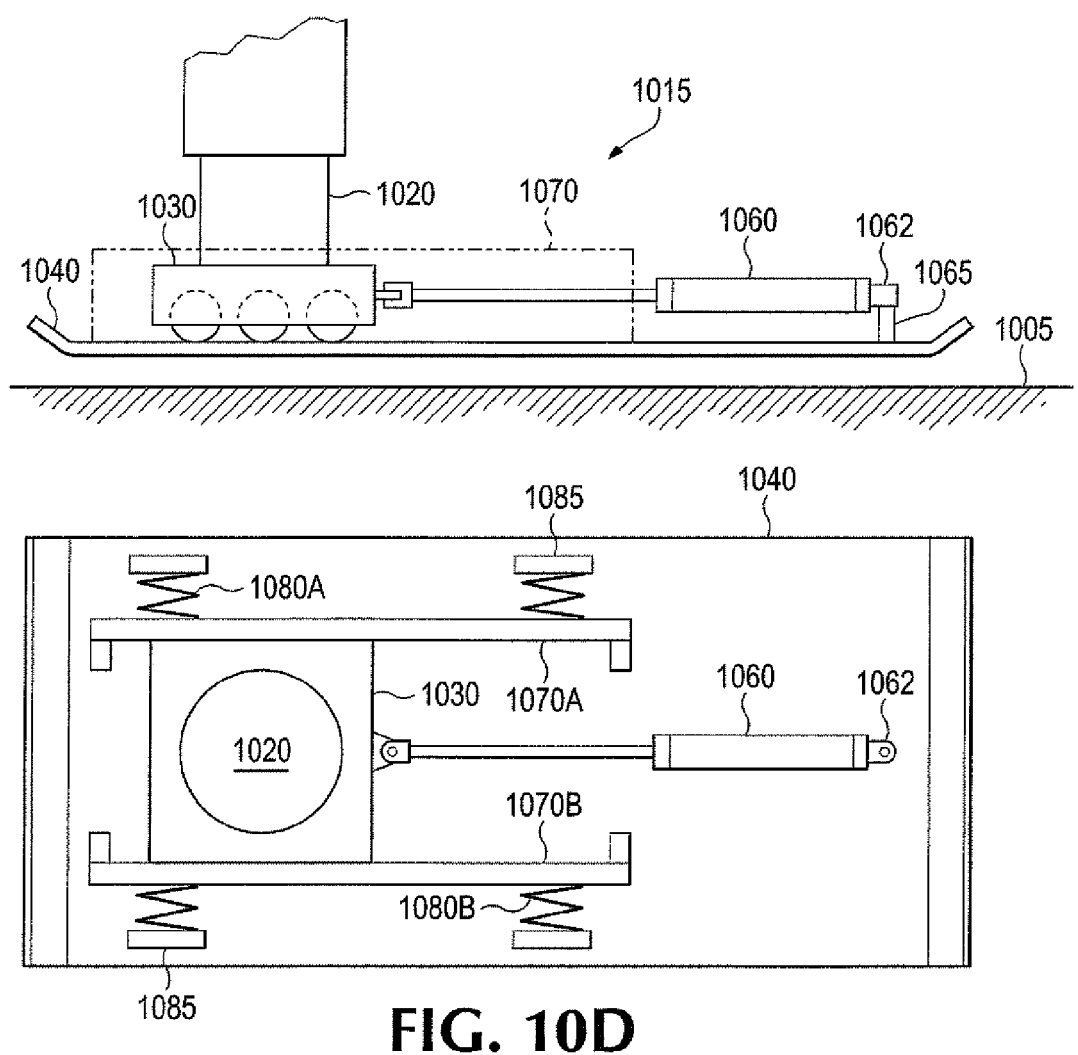

Referring to FIG. 10D, the travel cylinder 1060 is activated again to move the support foot 1040 forward in the direction of travel (here to the right). This movement repositions the support foot in anticipation of another walking cycle. From here, the lift mechanism would be activated to lower the support foot 1040 to the ground surface 1005 and raise the load, as shown in FIG. 10A.

Figure 11A:
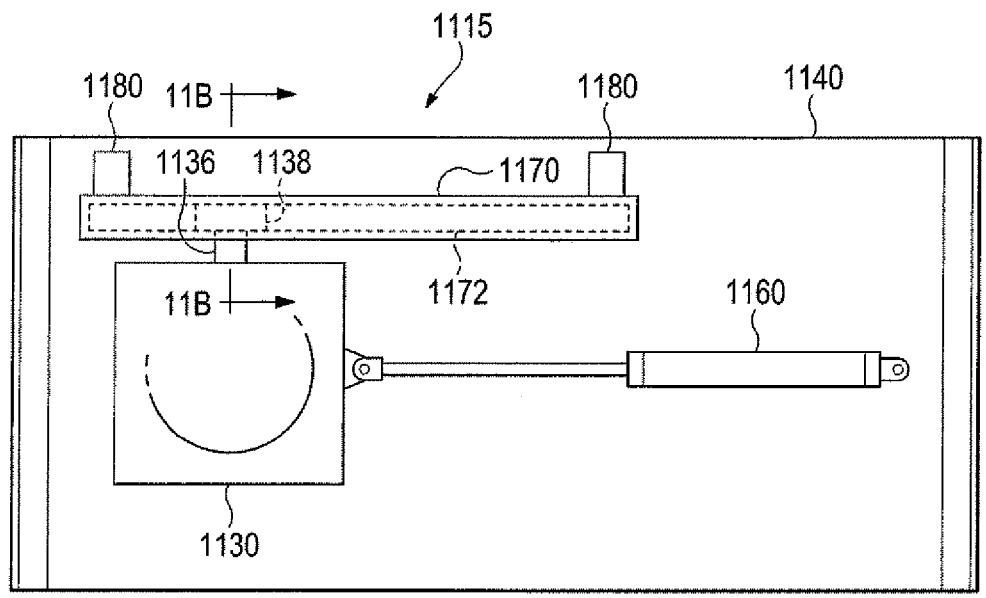
FIG. 11A is a top view of another example walking apparatus according to embodiments of the invention.
Figure 11B:
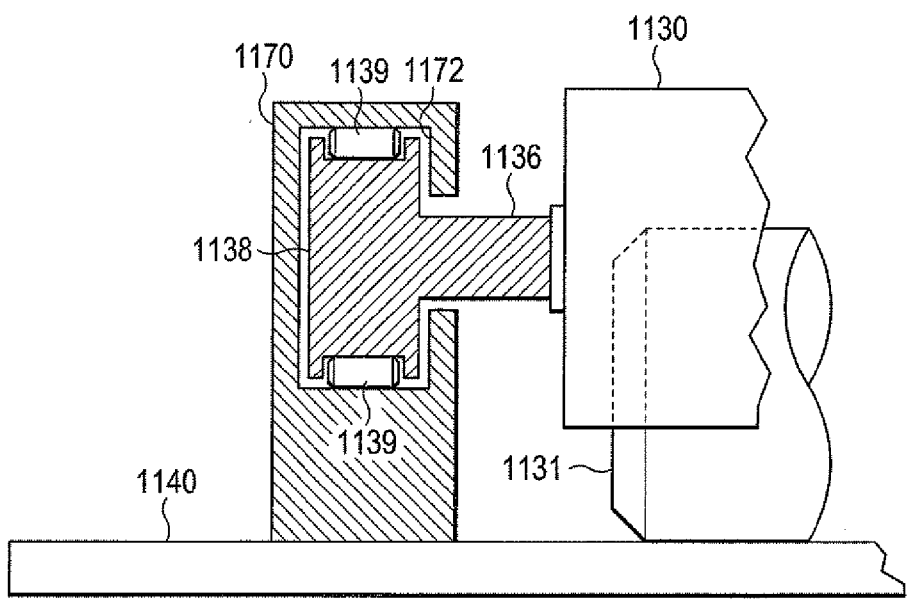
FIG. 11B is a cross-sectional detail diagram taken along line 11B of the walking apparatus shown in FIG. 11A.

FIG. 11A is a top view of another example walking apparatus according to embodiments of the invention. FIG. 11B is a cross-sectional detail diagram taken along line 11B of the walking apparatus shown in FIG. 11A. Referring to FIGS. 11A and 11B, a walking apparatus 1115 includes a roller assembly 1130 positioned on a support foot 1140. The roller assembly 1130 may include one or more rollers 1131 that allow the roller assembly to be moved by a travel mechanism 1160 connected to the roller assembly. The travel mechanism 1160 can be activated to move the roller assembly 1130 in a desired direction of travel relative to the support foot 1140 as described above. The walking apparatus 1115 also includes a guide device 1170 and one or more biasing devices 1180. The biasing devices 1180 may be fixed to the support foot 1140 (or roller track, as described above) and coupled to the guide device 1170. This configuration allows the guide device 1170 to be shifted relative to the support foot 1140 during non-linear movements, such as spin movements of the walking apparatus 1115.

Unlike some of the embodiments discussed above, the embodiment of the walking apparatus 1115 shown in FIGS. 11A and 11B include only a single guide bar 1170 positioned on one side of the roller assembly. To center the support foot 1140 during a recovery phase of a walking cycle when the roller assembly 1130 is displaced on either side of a longitudinal centerline of the support foot 1140 (i.e., deviates from a set direction of travel), the guide bar 1170 includes a slot 1172 that partially encloses a retaining portion 1138 of a guide spacer 1136. The guide spacer 1136 may be fixed to the roller assembly 1130 and move within the slot 1172 of the guide bar 1170 via guide rollers 1139. By partially enclosing the retaining portion 1138 of the guide spacer 1136, the guide device 1170 will compress the biasing devices 1180 if the roller assembly deviates from the direction of travel toward the guide device, and the guide device will expand the biasing devices if the roller assembly deviates from the direction of travel away from the guide device. Hence, this embodiment requires only a single guide bar 1170 rather than multiple guide bars around the roller assembly.

Figure 12A:
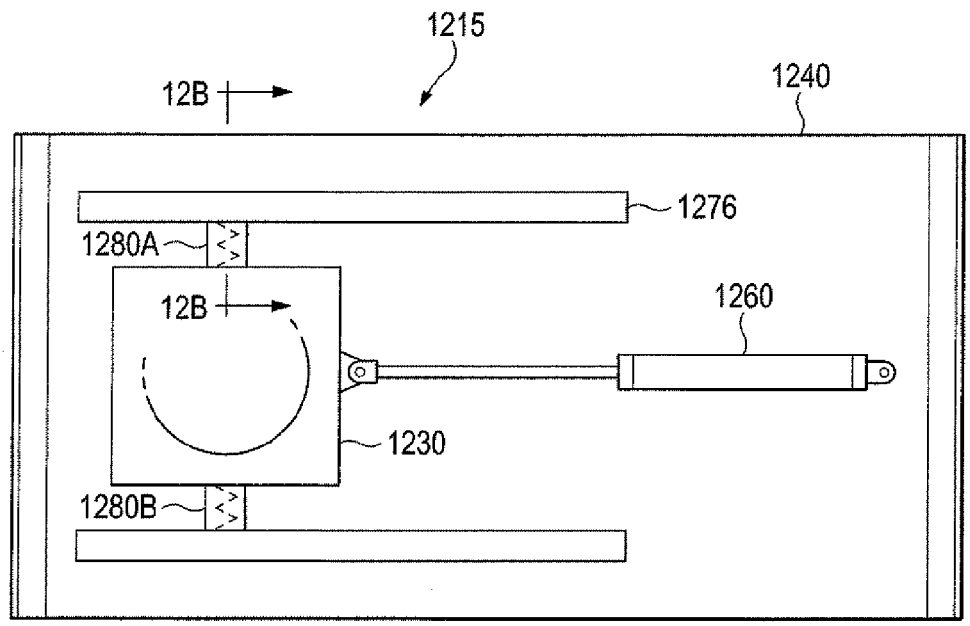
FIG. 12A is a top view of another example walking apparatus according to embodiments of the invention.
Figure 12B:
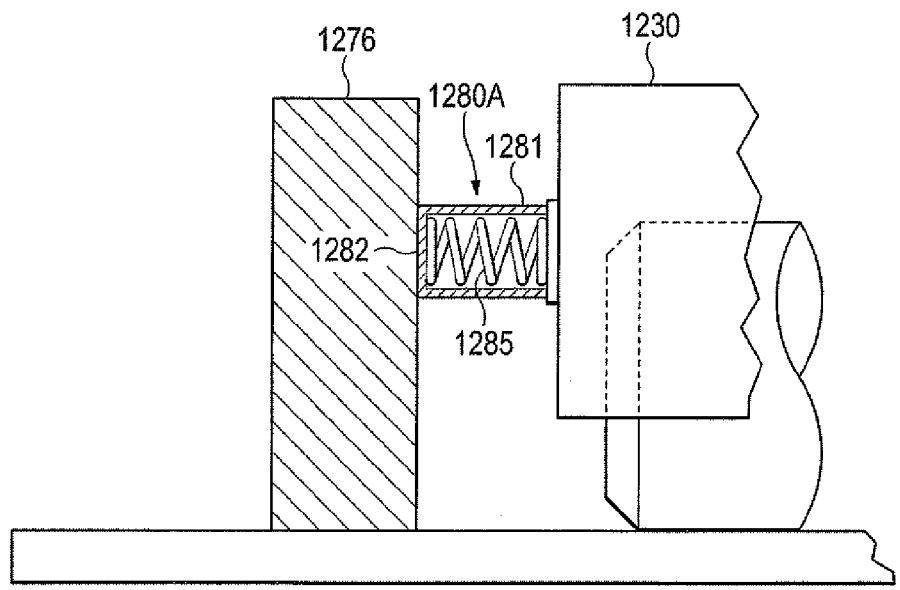
FIG. 12B is a cross-sectional detail diagram taken along line 12B of the walking apparatus shown in FIG. 12A.

FIG. 12A is a top view of another example walking apparatus according to embodiments of the invention. FIG. 12B is a cross-sectional detail diagram taken along line 12B of the walking apparatus shown in FIG. 12A. Referring to FIGS. 12A and 12B, a walking apparatus 1215 includes a roller assembly 1230 positioned on a support foot 1240. The roller assembly 1230 may include one or more rollers that allow the roller assembly to be moved by a travel mechanism 1260 connected to the roller assembly. The travel mechanism 1260 can be activated to move the roller assembly 1230 in a desired direction of travel relative to the support foot 1240 as described above. The walking apparatus 1215 also includes a guide device 1276 and one or more biasing devices 1280A, 1280B. In this embodiment, the guide bars 1276 of the guide device are fixed to the support foot 1240 and do not substantially move when the roller assembly is moved in a linear or non-linear manner relative to the set direction of travel. Rather, the biasing devices 1280A, 1280B are positioned between the fixed guide bars 1276 and the roller assembly 1230. This configuration allows the biasing devices 1280A, 1280B to be directly deflected by the movement of the roller assembly. Here, a first biasing device 1280A may be positioned and fixed on one side of the roller assembly 1230, and a second biasing device 1280B may be positioned and fixed on an opposite side of the roller assembly 1230.

In some embodiments, the biasing devices may each include a housing 1281, a pre-compressed spring 1285, and a rub surface 1282. The pre-compressed spring 1285 may be compressed a desired amount in the housing 1281. This pre-compression allows the biasing devices 1280A, 1280B to be deflected or compressed further when a deviation of travel from the roller assembly 1230 is directed toward the biasing device, while allowing the other biasing device on the other side of the roller assembly to disengage from the guide bar 1276. This allows a faster and easier return to a centered position because the biasing devices are not acting against each other. The housing 1281 may be structured to be flexible to allow further compression of the spring 1285, but have a maximum fixed extendable length to prevent the spring from extending beyond a desired pre-compressed state. The rub surface 1282 may be structured to move along the fixed guide bars 1276 without excessive friction. Hence, the rub surface may include a material with a relatively low coefficient of friction. Additionally, the rub surface may be replaceable in case it is excessively worn or otherwise damaged.

Figure 13:
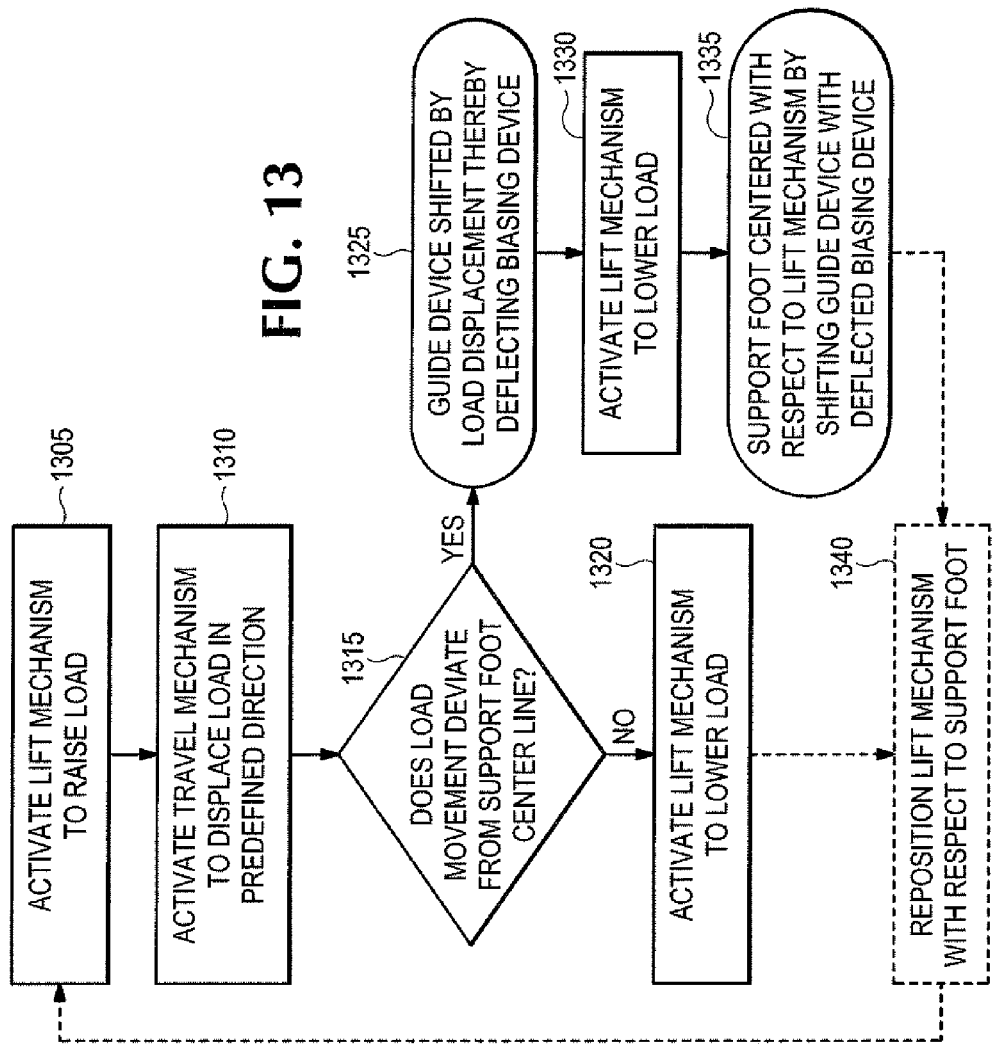
FIG. 13 is a flow diagram illustrating method of operating a load transporting apparatus according to embodiments of the invention.

FIG. 13 is a flow diagram illustrating method of operating a load transporting apparatus according to embodiments of the invention. In particular, the flow diagram of FIG. 13 illustrates a method of centering a lift mechanism of a load transporting device relative to a support foot during a load-transporting movement. The load transporting device includes a roller assembly coupled to the lift mechanism, a travel mechanism structured to displace the roller assembly relative to the support foot, and one or more guide devices coupled to the support foot by a biasing device and positioned adjacent to the roller assembly.

Referring to FIG. 13, a flow begins at process 1305 where the lift mechanism is activated to lower the support foot to a ground surface and raising a load supported by the load-bearing frame. In process 1310, the travel mechanism is activated to displace the roller assembly connected to the lift mechanism relative to the support foot and ground surface, thereby moving a position of the load in a predefined direction of travel. Depending on the movement of the travel mechanism relative to the centerline of the support foot (or in embodiments with a roller track, relative to the centerline of the roller track, or set direction of travel), the position of the lift cylinder may deviate from the longitudinal centerline of the support foot or roller track (i.e., deviate from a set direction of travel). As discussed above, when the roller assembly and load are moved off of a set direction of travel, the guide devices are shifted by the load displacement thereby deflecting the biasing devices. On the other hand, if the roller assembly moves along the set direction of travel (i.e., stays centered on a longitudinal centerline of the support foot or roller track), the guide devices are not shifted and the biasing devices are not further activated. In process 1315, it is observed whether the resulting position of the roller assembly has deviated from a set direction of travel or centerline of the support foot or roller track.

When the roller assembly has followed the set direction of travel, the flow proceeds to process 1320 where the lift mechanism is activated to lower the load and raise the support foot. However, when the roller assembly has deviated from a set direction of travel, the guide device is shifted by the movement of the roller assembly and load thereby deflecting the biasing device as shown in step 1325. That is, the biasing devices are deflected when movement of the roller assembly results in deviation from a set direction of travel. In process 1330, the lift mechanism is activated to lower the load and raise the support foot from the ground surface. As the support foot loses contact with the ground surface, the deflected biasing device acts on the support foot or roller track to center the support foot relative to the roller assembly, as shown in step 1335. That is, support foot and roller track, if present, are automatically centered with respect to the lift mechanism or lift cylinder. After step 1335 or process 1320, the flow may include optional process 1340 where the lift mechanism is repositioned with respect to the support foot. If further walking steps are needed to move the load to a final position, the flow may return to process 1305 to initiate another walking cycle.

As described above, some embodiments of this invention are directed to a load transporting apparatus configured to move a load over a ground surface in one or more incremental steps each including a load-movement phase and a recovery phase. The load transporting apparatus may include a load bearing frame attached to the load, and a lift mechanism having a lift cylinder connected to the load bearing frame and a cylinder rod. The lift mechanism may be structured, for example, to lift the load-bearing frame at the start of the load-movement phase. A roller assembly may be coupled to the cylinder rod of the lift mechanism, where the roller assembly includes a roller frame and one or more rollers set in the roller frame. The load transporting apparatus also includes a support foot coupled to the roller frame of the roller assembly and structured to interface with the ground surface. The support foot has a length, width, and longitudinal centerline bisecting the width of the support foot. A travel mechanism may be coupled to the roller assembly, where the travel mechanism is structured to move the roller assembly relative to the support foot during, for example, the load-movement phase of a walking cycle. Guide bars positioned on opposite sides of the roller frame are displaced adjacent to the roller frame. The guide bars may be positioned substantially parallel with the length of the support foot. Additionally, one or more biasing devices may be coupled between the guide bars and the support foot. The biasing devices may be structured to become deflected during a load-movement phase where the roller assembly is non-linearly displaced by the travel mechanism relative to the longitudinal center line of the support foot, and structured to return the support foot to a centered position relative to the roller assembly about the longitudinal center line of the support foot during a recovery phase.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out herein.

The invention claimed is:

1. An apparatus comprising:
 a support foot;
 a roller assembly configured to move relative to the support foot;
 a lift mechanism coupled to the roller assembly and configured to lift both the roller assembly and the support foot to a raised position; and
 a biasing system configured to apply a biasing force against the roller assembly as it moves relative to the support foot, wherein the biasing force causes the support foot to return to a neutral position relative to the roller assembly when the support foot is located in the raised position.

2. The apparatus of claim 1, further comprising a travel mechanism coupled to the roller assembly, wherein the travel mechanism is configured to displace the roller assembly relative to the support foot.

3. The apparatus of claim 2, wherein the travel mechanism is configured to displace the roller assembly in a non-linear direction relative to a longitudinal center line of the biasing system.

4. The apparatus of claim 1, wherein the neutral position comprises a centered position relative to the roller assembly about a longitudinal center line of the support foot.

5. The apparatus of claim 4, wherein the biasing system comprises two guide bars positioned on opposite sides of the roller assembly and oriented substantially parallel to the longitudinal center line of the support foot.

6. The apparatus of claim 5, wherein the roller assembly deflects at least one of the two guide bars when movement of the roller assembly deviates from the longitudinal centerline of the support foot.

7. The apparatus of claim 5, wherein the roller assembly is configured to deflect at least one of the two guide bars when the apparatus is rotated about the support foot.

8. The apparatus of claim 5, wherein the biasing system is configured to apply the biasing force against at least one of the two guide bars when the roller assembly is non-linearly displaced relative to the longitudinal center line of the support foot.

9. The apparatus of claim 1, further comprising a guide device including two guide bars positioned on opposite sides of the roller assembly, wherein the biasing system is configured to apply the biasing force against the roller assembly by deflecting at least one of the two guide bars into the roller assembly.

10. The apparatus of claim 1, further comprising:
a roller track connected to the support foot, wherein the roller assembly is configured to move over the roller track, and wherein the biasing system is configured to apply the biasing force as the roller assembly deviates from a longitudinal center line of the roller track; and
a pin connector connecting the support foot with the roller track, wherein the pin connector is configured to allow the roller track to rotate relative to the support foot.

11. An apparatus, comprising:
means for raising a load transporting device;
means for moving a roller assembly relative to a support foot of the load transporting device, wherein the roller assembly is connected to the means for raising, and wherein the load transporting device moves in response to moving the roller assembly;
means for applying a bias force against the roller assembly as it deviates from a neutral position relative to the support foot, wherein the bias force causes the support foot to move relative to the roller assembly with the support foot located in a raised position so that the roller assembly returns to the neutral position.

12. The apparatus of claim 11, wherein the means for moving comprises means for displacing the roller assembly in a non-linear direction relative to a longitudinal centerline of the support foot.

13. The apparatus of claim 11, further comprising means for guiding the roller assembly as it moves relative to the support foot, wherein the means for guiding is located adjacent to the roller assembly.

14. The apparatus of claim 13, wherein the means for applying a bias force comprise means for applying the bias force against the means for guiding, and wherein the means for guiding is configured to deflect towards the rolling assembly in response to the bias force.

15. The apparatus of claim 11, wherein the means for moving comprises means for laterally displacing the roller assembly from a longitudinal centerline of the means for applying a bias force, and wherein the bias force causes the roller assembly to return to the longitudinal centerline when the support foot is located in the raised position.

16. The apparatus of claim 11, wherein the means for raising comprises a lift cylinder and a cylinder rod, and wherein the roller assembly is coupled to the cylinder rod.

17. The apparatus of claim 11, wherein the roller assembly comprises a roller frame connected to the support foot and one or more rollers set in the roller frame, and wherein the bias force causes the roller assembly to return to a longitudinal centerline of the roller frame when the support foot is located in the raised position.

18. The apparatus of claim 11, wherein the means for moving is coupled to the roller assembly with a pin connection to allow the roller assembly to pivot relative to the means for moving.

19. The apparatus of claim 11, wherein the roller assembly comprises a roller track, and wherein the support foot is directly coupled to the roller track.

20. The apparatus of claim 19, wherein the roller track is coupled to the support foot with a king pin connection device.

* * * * *